(12) United States Patent
Burbidge et al.

(10) Patent No.: US 9,094,858 B2
(45) Date of Patent: Jul. 28, 2015

(54) METHODS AND APPARATUS TO INVOKE QUALITY OF SERVICE BASED NETWORK RECOVERY

(75) Inventors: Richard Charles Burbidge, Hook (GB); Claude Jean-Frederic Arzelier, Cannes (FR); Rene Faurie, Courbevoie (FR); Eniko Sokondar, Windsor (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/816,688

(22) PCT Filed: Jul. 28, 2011

(86) PCT No.: PCT/IB2011/002543
§ 371 (c)(1),
(2), (4) Date: Feb. 12, 2013

(87) PCT Pub. No.: WO2012/023048
PCT Pub. Date: Feb. 23, 2012

(65) Prior Publication Data
US 2013/0150024 A1    Jun. 13, 2013

(30) Foreign Application Priority Data
Aug. 16, 2010 (EP) .................................... 10290447

(51) Int. Cl.
*H04W 24/00* (2009.01)
*H04W 24/04* (2009.01)
(Continued)

(52) U.S. Cl.
CPC ............ *H04W 24/04* (2013.01); *H04W 76/028* (2013.01); *H04W 60/04* (2013.01)

(58) Field of Classification Search
CPC ....... H04W 24/00; H04W 60/00; H04W 4/16; H04W 36/30; H04W 48/16; H04W 84/02; H04W 28/04; H04W 28/06; H04L 29/06027
USPC .............. 455/423, 435.1, 445, 436, 434, 403; 370/352, 329, 349
See application file for complete search history.

(56) References Cited

U.S. PATENT DOCUMENTS

2007/0178888 A1    8/2007    Alfano et al.
2007/0218911 A1    9/2007    Islam et al.
(Continued)

FOREIGN PATENT DOCUMENTS

EP    2421321    2/2012
EP    2421322    2/2012
(Continued)

OTHER PUBLICATIONS

International Bureau, "International Preliminary Report on Patentability," issued in connection with international application serial No. PCT/IB2011/002577, mailed Feb. 28, 2013, 10 pages.
(Continued)

*Primary Examiner* — Charles Appiah
*Assistant Examiner* — Alexander Yi
(74) *Attorney, Agent, or Firm* — Fish & Richardson P.C.

(57) ABSTRACT

Example methods and apparatus to conditionally invoke network recovery are disclosed. A disclosed example method in a wireless device involves detecting a radio resource connection failure and identifying whether downlink data is expected. The disclosed example method also includes initiating a registration procedure when downlink data is expected.

14 Claims, 14 Drawing Sheets

(51) Int. Cl.
*H04W 76/02* (2009.01)
*H04W 60/04* (2009.01)

(56) References Cited

U.S. PATENT DOCUMENTS

| | | | |
|---|---|---|---|
| 2009/0111423 A1 | 4/2009 | Somasundaram et al. | |
| 2009/0270099 A1* | 10/2009 | Gallagher et al. | 455/435.1 |
| 2010/0003982 A1 | 1/2010 | Somasundaram et al. | |
| 2010/0087193 A1* | 4/2010 | Bishop et al. | 455/435.1 |
| 2011/0128923 A1* | 6/2011 | Cilli et al. | 370/329 |
| 2012/0157132 A1* | 6/2012 | Olsson et al. | 455/458 |

FOREIGN PATENT DOCUMENTS

| | | |
|---|---|---|
| WO | 2012023048 | 2/2012 |
| WO | 2012023049 | 2/2012 |

OTHER PUBLICATIONS

International Bureau, "International Preliminary Report on Patentability," issued in connection with international application serial No. PCT/IB2011/002543, mailed Feb. 28, 2013, 6 pages.
3GPP, "NAS Recovery On/Off Mechanism (3G)," 3GPP TSG CT WG1 Meeting #57, Change Request, C1-090415, Budapest, Hungary, Aug. 18-22, 2008, 6 pages.
3GPP, "NAS Recovery On/Off Mechanism (LTE)," 3GPP TSG CT WG1 Meeting #57, Change Request, C1-090416, San Antonio, USA, Feb. 9-19, 2009, 6 pages.
3GPP, "NAS Recovery On/Off Mechanism," 3GPP TSG CT WG1 Meeting #57, C1-090417, San Antonio, USA, Feb. 9-19, 2009, 2 pages.
International Searching Authority, "International Search Report," issued in connection with international application serial No. PCT/IB2011/002577, mailed Feb. 1, 2012, 5 pages.
International Searching Authority, "Written Opinion of the International Searching Authority," issued in connection with international application serial No. PCT/IB2011/002577, mailed Feb. 1, 2012, 10 pages.
3GPP, "Discussion: NAS Service Recovery," 3GPP TSG WG1 Meeting #55bis, C1-083917, Phoenix, Arizona, Oct. 6-10, 2008, 6 pages.
3GPP, "Addition of a Case to Initiate Routing Area Update Procedure," 3GPP TSG-CT WG1 Meeting #65, C1-102361, Dublin, Ireland, Jun. 28-Jul. 2, 2010, 8 pages.
3GPP, "LS on Draft Response LS on Connection Recovery by NAS," 3GPP TSG-CT WG1 Meeting #55bis, C1-084495, Phoenix, Arizona, Oct. 6-10, 2008, 2 pages.
International Searching Authority, "International Search Report," issued in connection with international application serial No. PCT/IB2011/002543, mailed Jan. 31, 2012, 4 pages.
International Searching Authority, "Written Opinion of the International Searching Authority," issued in connection with international application serial No. PCT/IB2011/002543, mailed Jan. 31, 2012, 8 pages.
3GPP, "GBR Bearer Termination at Radio Link Failure," 3GPP TSG SA WG2 Meeting #75, S2-095242, Kyoto, Japan, Aug. 31-Sep. 4, 2009, 4 pages.
European Patent Office, "Office Communication," issued in connection with European application serial No. 10 290 446.3, issued Nov. 21, 2011, 4 pages.
European Patent Office, "Search Report," issued in connection with European application serial No. 10 290 446.3, issued Jan. 17, 2011, 10 pages.
3GPP, "What is the EPS Bearer?," copyright 2010, 2 pages.
Wikipedia, "E-UTRA," retrieved from Wikipedia on Aug. 2, 2010, 10 pages.
Wikipedia, "General Packet Radio Service," retrieved from Wikipedia on Jun. 3, 2010, 5 pages.
Wikipedia, "GPRS Core Network" retrieved from Wikipedia on Jun. 4, 2010, 6 pages.
"Information Flows," Session 2-System Architecture, Chris Cox Communications Limited 2009, 21 pages.
Mobile Telecom Networks, "NAS: Non-Access Stratum," Oct. 12, 2009, 3 pages.
"Radio Resource Control," creative commons attribution-share Alike 3.0 Unported, 3 pages.
Wikipedia, "UMTS Terrestrial Radio Access Network," retrieved from Wikipedia on Aug. 2, 2010, 1 page.
Agilent Technologies, "8960 W-CDMA/HSPA Online User's Guide," Jan. 15, 2009, 5 pages.
Wired N Wireless, "EPS Mobility Management and Connection Management," Jan. 21, 2009, 3 pages.
INACON GmbH, "LTE from A-Z, Technology and Concepts of the 4G 3GPP Standard," copyright 1999-2008, 11 pages.
European Patent Office, "Search Report," issued in connection with European application serial No. 10 290 447.1, issued Jan. 20, 2011, 9 pages.
European Patent Office, "Office Communication," issued in connection with European application serial No. 10 290 447.1, issued Nov. 10, 2011, 4 pages.
Canadian Intellectual Property Office, "Examination Report," issued in connection with corresponding Canadian Patent Application No. 2,808,295, mailed Sep. 23, 2014 (2 pages).
Canadian Intellectual Property Office, "Examination Report," issued in connection with corresponding Canadian Patent Application No. 2,808,571, mailed Sep. 26, 2014 (2 pages).
European Patent Office, "Office Communication," issued in connection with European application serial No. 10 290 446.3, issued Jul. 11, 2013 (4 pages).
European Patent Office, "Intention to Grant," issued in connection with European application serial No. 10 290 447.1, issued Sep. 4, 2013 (5 pages).

* cited by examiner

150
METHODS AND APPARATUS TO INVOKE QUALITY OF SERVICE BASED NETWORK RECOVERY

FIELD OF THE DISCLOSURE

The present disclosure relates generally to network communications and, more particularly, to methods and apparatus to invoke quality of service based network recovery.

BACKGROUND

User equipment (UE), such as mobile devices, communicates with radio access networks (RANs) including any number of base stations. Such base stations may include enhanced Node B (eNB) base stations operating according to an enhanced universal terrestrial radio access (E-UTRA) radio interface defined by the third generation partnership project (3GPP). The E-UTRA radio interface, also referred to as long term evolution (LTE), may operate within an E-UTRA network (E-UTRAN) to allow wireless services for UEs throughout a geographical area.

The E-UTRAN is typically communicatively connected to an evolved packet core (EPC) network. In the event that connectivity between a UE (and/or any number of UEs) and the E-UTRAN is lost, connection may be re-established by way of non-access stratum (NAS) procedure(s). In some circumstances, the invoked NAS procedures may consume substantial resources of the network (e.g., a 3GPP standards based network, such as an EPC/LTE network, a GSM network or a UMTS network) to which the UE attempts to reconnect and result in deteriorated services.

DETAILED DESCRIPTION

Figure 1:
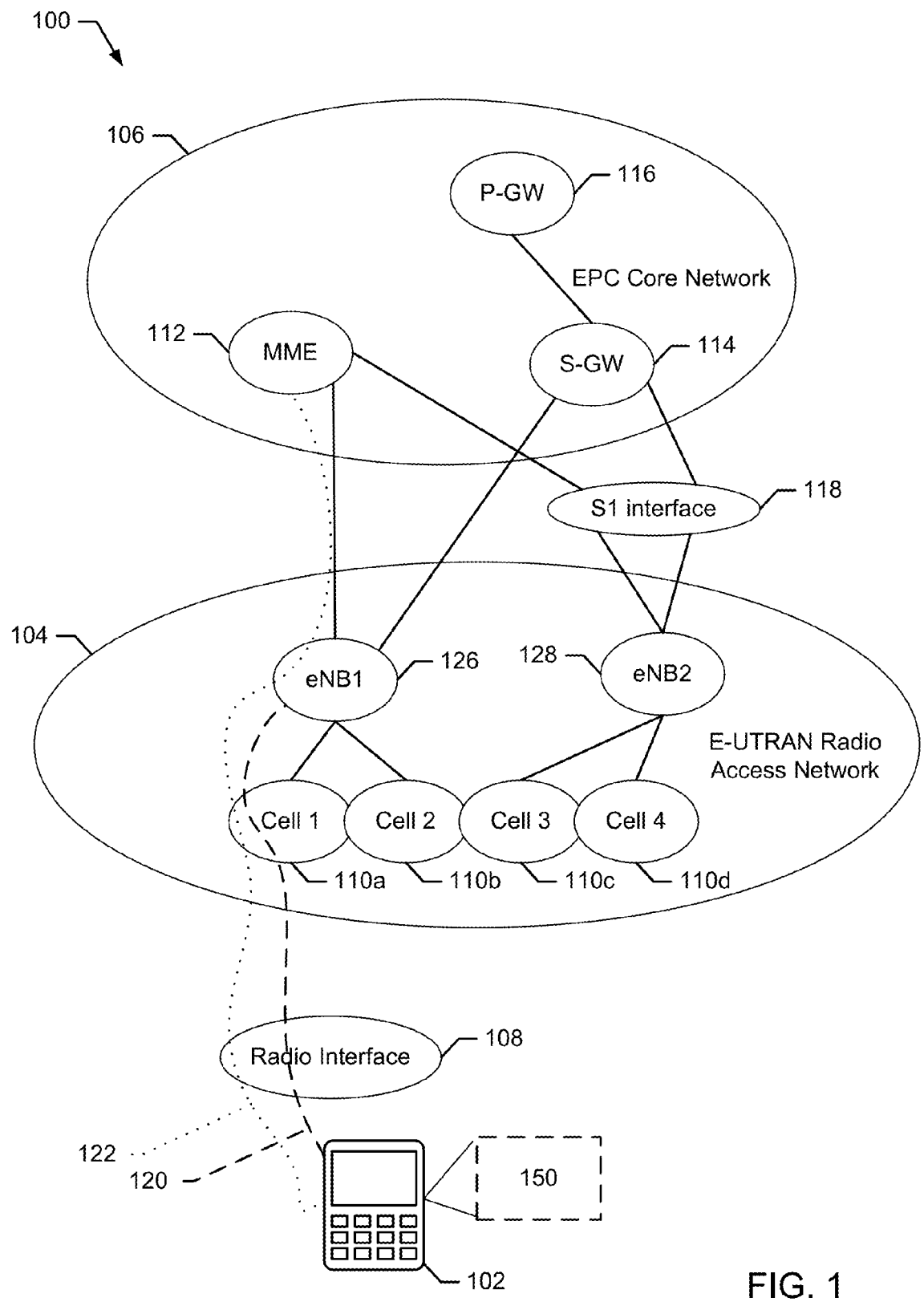
FIG. 1 depicts example mobile communication networks that can receive one or more connection requests from user equipment.

Although the following discloses example methods and apparatus including, among other components, software executed on hardware, it should be noted that such methods and apparatus are merely illustrative and should not be considered as limiting. For example, any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only ways to implement such methods and apparatus.

An example method in a wireless device disclosed herein includes detecting a radio resource connection failure, identifying whether downlink data is expected, and initiating a registration procedure when downlink data is expected.

In some implementations, the radio connection failure is to be detected from at least one of a radio link control (RLC) layer or a medium access control (MAC) layer, while in other implementations the registration procedure comprises at least one of tracking area updating procedure or a routing area updating procedure. In still other implementations, the radio resource connection failure includes a radio resource control connection failure, and in other implementations the radio resource connection failure comprises a radio link failure. Other implementations include the registration procedure comprises a non-access stratum registration procedure, and still other implementations include initiating the registration procedure when the wireless device has uplink user data pending. In some implementations, the wireless device identifies whether downlink data is expected after determining that no uplink user data is pending, and in other implementations the wireless device is in an evolved packet system mobility management state of type registered when initiating the registration procedure. Still other implementations include the registration procedure initiated by sending a tracking area update request message to a mobility management entity, some implementations include preventing the registration procedure when no downlink data is expected, and some implementations include the wireless device identifying whether downlink data is expected based on information provided by an application layer, wherein the application layer receives information from at least one of an e-mail application, a video telephony application, a file transfer protocol application, a browser application, or a navigation application. In some implementations, the wireless device identifies whether downlink data is expected based on information provided by at least one of a radio link control (RLC) layer or a medium access control (MAC) layer. Any of the foregoing implementations of the example method in the wireless device may be combined, without limitation.

An example mobile station disclosed herein includes hardware and software stored on a tangible computer readable medium that, during operation, causes the mobile station to detect a radio connection failure, identify whether downlink data is expected, and initiate a registration procedure when downlink data is expected.

In some implementations, the hardware and software further cause the mobile station to detect the radio connection failure from a radio resource control protocol or a non-access stratum protocol. In other implementations, the registration procedure includes at least one of tracking area updating procedure or a routing area updating procedure, while in other implementations the radio resource connection failure includes a radio resource control connection failure. In still other implementations, the radio resource connection failure comprises a radio link failure, and in some implementations the registration procedure comprises a non-access stratum registration procedure. For other implementations, the hardware and software further cause the mobile station to initiate the registration procedure when the wireless device has uplink user data pending, and in some implementations the hardware and software further cause the mobile station to identify whether downlink data is expected after determining that no uplink user data is pending. In some implementations, the wireless device is in an evolved packet system mobility management state of type registered when initiating the registration procedure, and in other implementations the hardware and software further cause the mobile station to send a tracking area update request message to a mobility management entity. Some implementations include the hardware and software causing the mobile station to prevent the registration procedure when no downlink data is expected, and in other implementations the mobile station identifies whether downlink data is expected based on information received from an application layer, wherein the application layer receives information from at least one of an e-mail application, a video telephony application, a file transfer protocol application, a browser application, or a navigation application. In still other implementations, downlink data is expected based on information provided by at least one of a radio link control (RLC) layer or a medium access control (MAC) layer. Any of the foregoing implementations of the example mobile station may be combined, without limitation.

Another example method in a wireless device disclosed herein includes detecting a loss of connection from a radio access network, sending a connection establishment request to a cell within the radio access network, identifying whether a data exchange is expected when the wireless device receives a re-establishment reject message from the radio access network, and when the wireless device identifies that the data exchange is expected, initiating a non-access stratum procedure with a core network.

In some implementations, the loss of connection further includes detecting a radio resource control connection failure, while in other implementations detecting the loss of connection further includes detecting a radio link failure. For other implementations, the connection establishment request comprises an access stratum protocol request message, and in some implementations initiating the non-access stratum procedure includes sending a tracking area updating message to a mobility management entity. For still other implementations, the data exchange expected includes downlink data, and in other implementations the data exchange expected comprises uplink data. Still further implementations include preventing the non-access stratum procedure when the UE identifies that no data exchange is expected. Any of the foregoing implementations of the example method in a wireless device may be combined, without limitation.

Another example mobile station disclosed herein includes hardware and software stored on a tangible computer readable medium that, during operation, causes the mobile station to detect a loss of connection from a radio access network, send a connection establishment request to a cell within the radio access network, identify whether a data exchange is expected when the wireless device receives a re-establishment reject message from the radio access network, and when the wireless device identifies that the data exchange is expected, initiate a non-access stratum procedure with a core network.

In some implementations, the hardware and software further cause the mobile station to detect a radio resource control connection failure, and in other implementations the connection establishment request includes an access stratum protocol request message. In still other implementations, detecting a loss of connection further includes detecting a radio link failure, and in some implementations the hardware and software further cause the mobile station to send a tracking area updating message to a mobility management entity. In some implementations, the data exchange expected includes downlink data, while in other implementations the data exchange expected comprises uplink data. For still other implementations, the hardware and software further cause the mobile station to prevent the non-access stratum procedure when the UE identifies that no data exchange is expected. Any of the foregoing implementations of the example mobile station may be combined, without limitation.

Another example method in a wireless device disclosed herein includes receiving an indication of a radio connection failure associated with long term evolution (LTE) operation, changing an operating mode from an LTE mode to a non-LTE mode, and initiating a non-access stratum (NAS) connection protocol when the UE expects downlink data.

In some implementations, the radio connection failure includes a radio resource control connection failure, and in other implementations the radio connection failure includes a radio link failure. In other implementations the non-LTE mode includes at least one of a global system for mobile communications (GSM) mode or a universal mobile telecommunications system (UMTS) mode, wherein the GSM mode comprises an A/Gb mode, or, wherein the UMTS mode comprises an Iu mode. For other implementations, the LTE mode includes an S1 mode, and in still other implementations the wireless device expects downlink data based on information provided by at least one of a radio link control (RLC) layer or a medium access control (MAC) layer, wherein an application layer provides an indication of downlink data, and wherein the application layer receives information from at least one of an e-mail application, a file transfer protocol application, a browser application, or a navigation application. In other implementations, initiating the NAS protocol is based on at least one of an evolved packet system (EPS) bearer context quality of service or a packet data protocol (PDP) context quality of service parameter, wherein the PDP context quality of service parameter includes at least one of a precedence class, a reliability class or a traffic handling priority. For some implementations, the EPS bearer context quality of service parameter comprises at least one of guaranteed bit rate criteria or quality of service class identifier criteria. Any of the foregoing implementations of the example method in a wireless device may be combined, without limitation.

Another example mobile station disclosed herein includes hardware and software stored on a tangible computer readable medium that, during operation, cause the mobile station to receive an indication of a radio connection failure associated with long term evolution (LTE) operation, change an operating mode from an LTE mode to a non-LTE mode, and initiate a non-access stratum (NAS) connection protocol when the UE expects downlink data.

In some implementations, the radio connection failure comprises a radio resource control connection failure, while in other implementations the radio connection failure comprises a radio link failure. For some implementations the non-LTE mode includes at least one of a global system for mobile communications (GSM) mode or a universal mobile telecommunications system (UMTS) mode, in other implementations the GSM mode is an A/Gb mode, and in still other implementations the UMTS mode comprises an Iu mode. For other implementations, the LTE mode comprises an S1 mode. In some implementations, the hardware and software further cause the mobile station to expect downlink data based on an indication provided by a radio link control (RLC) layer or a medium access control (MAC) layer, and in other implementations the hardware and software further cause the mobile station to provide an indication of downlink data via an application layer, wherein the application layer receives information from at least one of an e-mail application, a file transfer protocol application, a browser application, or a navigation application. For still other implementations, the hardware and software further cause the mobile station to initiate the NAS protocol is based on at least one of an evolved packet system (EPS) bearer context quality of service or a packet data protocol (PDP) context quality of service parameter, wherein the PDP context quality of service parameter comprises at least one of a precedence class, a reliability class or a traffic handling priority, or wherein the EPS bearer context quality of service parameter includes at least one of guaranteed bit rate criteria or quality of service class identifier criteria. Any of the foregoing implementations of the example mobile station may be combined, without limitation.

Another example method in a wireless device disclosed herein includes detecting an indication of a radio resource control (RRC) connection failure, identifying whether downlink data is expected, and initiating a registration procedure in response to receipt of the indication of expected downlink data.

In some implementations, the method includes identifying whether the wireless device has uplink user data pending, and in other implementations the method includes initiating the registration procedure in response to identifying that uplink user data is pending. In still other implementations wireless device identifies whether downlink data is expected based on information provided by at least one of a radio link control (RLC) layer or a medium access control (MAC) layer, wherein initiating the registration procedure occurs in response to identifying data queued in the MAC layer, or wherein the registration procedure includes a tracking area updating procedure. Any of the foregoing implementations of the example method in a wireless device may be combined, without limitation.

Another example mobile station disclosed herein includes hardware and software stored on a tangible computer readable medium that, during operation, causes the mobile station to detect an indication of a radio resource control (RRC) connection failure, identify whether downlink data is expected, and initiate a registration procedure in response to receipt of the indication of expected downlink data.

In some implementations, the hardware and software further cause the mobile station to identify whether the wireless device has uplink user data pending, wherein the hardware and software further cause the mobile station to initiate the registration procedure in response to identifying that uplink user data is pending. In other implementations, the RRC connection failure occurs in at least one of a radio link control (RLC) layer or a medium access control (MAC) layer, wherein the hardware and software further cause the mobile station to initiate the registration procedure in response to identifying data queued in the MAC layer, or wherein the registration procedure comprises a tracking area updating procedure. Any of the foregoing implementations of the example mobile station may be combined, without limitation.

Another example method in a wireless device disclosed herein includes detecting a radio connection failure when the wireless device is in a long term evolution mode, and initiating a non-access stratum (NAS) connection procedure when a discontinuous reception (DRX) mode was active before an access stratum (AS) connection re-establishment procedure.

In some implementations, the radio connection failure includes identifying whether the wireless device exits a radio resource control (RRC) connected mode, while in other implementations the AS connection re-establishment comprises a radio resource control (RRC) procedure. In other implementations, the method includes detecting a status of a data buffer during the RRC procedure, further including initiating the NAS connection procedure when the buffer status is indicative of not empty. In still other implementations, the data buffer includes a downlink radio link control (RLC) buffer. Any of the foregoing implementations of the example method in a wireless device may be combined, without limitation.

Another example mobile station disclosed herein includes hardware and software stored on a tangible computer readable medium that, during operation, cause the mobile station to detect a radio connection failure when the wireless device is in a long term evolution mode, and initiate a non-access stratum (NAS) connection procedure when a discontinuous reception (DRX) mode was active before an access stratum (AS) connection re-establishment procedure.

In some implementations, the hardware and software further cause the mobile station to detect the radio connection failure by identifying whether the wireless device exits a radio resource control (RRC) connected mode, and in other implementations the AS connection re-establishment comprises a radio resource control (RRC) procedure, wherein the hardware and software further cause the mobile station to detect a status of a data buffer during the RRC procedure, and wherein the hardware and software further cause the mobile station to initiate the NAS connection procedure when the buffer status is indicative of not empty. For still other implementations, the data buffer includes a downlink radio link control (RLC) buffer. Any of the foregoing implementations of the example mobile station may be combined, without limitation.

Another example method in a wireless device disclosed herein includes detecting an indication of a radio connection failure, identifying whether the wireless device has uplink user data pending, identifying whether the wireless device has active bearers having quality of service (QoS) criteria when the UE has no uplink user data pending, and triggering a registration procedure in response to identifying the bearer criteria.

In some implementations, registration procedure includes a tracking area updating procedure, and in other implementations the registration procedure comprises a routing area updating procedure. Other implementations include the radio connection failure having a radio resource control (RRC) connection failure, wherein the radio connection failure includes a radio link failure. In still other implementations, the QoS criteria further includes a guaranteed bit rate (GBR) bearer, and in other implementations the GBR bearer comprises an evolved packet system (EPS) bearer. Some implementations include triggering the registration procedure when the bearer criteria comprises a QoS class identifier (QCI) value, wherein the QCI value falls within a threshold value range to cause the trigger of the registration procedure. Other implementations include the bearer criteria based on evolved packet system bearer contexts or packet data protocol contexts. Any of the foregoing implementations of the example method in a wireless device may be combined, without limitation.

Another example mobile station disclosed herein includes hardware and software stored on a tangible computer readable medium that, during operation, cause the mobile station to detect an indication of a radio connection failure, identify whether the wireless device has uplink user data pending, identify whether the wireless device has active bearers having quality of service (QoS) criteria when the UE has no uplink user data pending, and trigger a registration procedure in response to identifying the bearer criteria.

In some implementations, the registration procedure includes a tracking area updating procedure, wherein the registration procedure includes a routing area updating procedure, and wherein the radio connection failure includes a radio resource control (RRC) connection failure. In other implementations the radio connection failure comprises a radio link failure, and in some implementations the QoS criteria further comprises a guaranteed bit rate (GBR) bearer. For still other implementations, the GBR bearer comprises an evolved packet system (EPS) bearer, while for some implementations the hardware and software further cause the mobile station to trigger the registration procedure when the bearer criteria comprises a QoS class identifier (QCI) value, wherein the QCI value falls within a threshold value range to cause the trigger of the registration procedure. Some implementations include the hardware and software further causing the mobile station to base the bearer criteria on evolved packet system bearer contexts or packet data protocol contexts. Any of the foregoing implementations of the example mobile station may be combined, without limitation.

Another example method in a wireless device disclosed herein includes detecting an operating mode change from long term evolution (LTE) to a non-LTE mode, detecting a radio connection failure associated with the LTE operating mode, and initiating a registration procedure when the wireless device is associated with an activated bearer associated with a quality of service (QoS) criteria.

In some implementations, the registration procedure includes a tracking area updating procedure, and in other implementations the registration procedure includes a routing area updating procedure. In still other implementations, the non-LTE mode includes at least one of global system for mobile communications (GSM) mode or universal mobile telecommunications system (UMTS) mode, and in some implementations the radio connection failure includes a radio resource control (RRC) connection failure. For some implementations, the radio connection failure comprises a radio link failure, and in other implementations the bearer includes a guaranteed bit rate. Some implementations include initiating the registration procedure is based on at least one of an evolved packet system (EPS) bearer context or a packet data protocol (PDP) context quality of service parameter, further including initiating the registration procedure when the PDP context quality of service parameter comprises a traffic class of at least one of conversational or streaming. In other implementations, the PDP context quality of service parameter comprises a precedence class, wherein the precedence class includes at least one of high priority criteria or normal priority criteria. In some implementations, the PDP context quality of service parameter comprises a traffic handling priority value, wherein the traffic handling priority value comprises at least one of 1 or 2. Any of the foregoing implementations of the example method in a wireless device may be combined, without limitation.

Another example mobile station disclosed herein includes hardware and software stored on a tangible computer readable medium that, during operation, causes the mobile station to detect an operating mode change from long term evolution (LTE) to a non-LTE mode, detect a radio connection failure associated with the LTE operating mode, and initiate a registration procedure when the wireless device is associated with an activated bearer associated with a quality of service (QoS) criteria.

In some implementations, the registration procedure includes a tracking area updating procedure, wherein the registration procedure includes a routing area updating procedure. In other implementations, the non-LTE mode includes at least one of global system for mobile communications (GSM) mode or universal mobile telecommunications system (UMTS) mode, and in some implementations the radio connection failure includes a radio resource control (RRC) connection failure, or the bearer includes a guaranteed bit rate. For some implementations, the hardware and software further cause the mobile station to initiate the registration procedure is based on at least one of an evolved packet system (EPS) bearer context or a packet data protocol (PDP) context quality of service parameter, wherein the hardware and software further cause the mobile station to initiate the registration procedure when the PDP context quality of service parameter comprises a traffic class of at least one of conversational or streaming. In other implementations, the PDP context quality of service parameter includes a precedence class, wherein the precedence class includes at least one of high priority criteria or normal priority criteria. While in some implementations the PDP context quality of service parameter comprises a traffic handling priority value, wherein the traffic handling priority value comprises at least one of 1 or 2. Any of the foregoing implementations of the example mobile station may be combined, without limitation.

Another example method in a wireless device disclosed herein includes receiving a recovery indicator from a network, and initializing a registration procedure in response to detecting a data connection loss, the registration procedure initialization based on a value of the recovery indicator.

In some implementations, the registration procedure includes a non-access stratum (NAS) recovery action, while in other implementations the NAS recovery action includes at least one of a tracking area update message, a routing area update message, or a combined routing area update message. In still other implementations the recovery indicator is a non-access stratum (NAS) recovery indicator, wherein the NAS recovery indicator includes a two bit value, the registration procedure to be initialized based on the two bit value, and wherein the two bit value instructs the wireless device to send a tracking area update message in response to detecting the data connection loss. In still other implementations the two bit value instructs the wireless device to send a routing area update message in response to detecting the data connection loss, and in some implementations the two bit value instructs the wireless device to send at least one of a tracking area update message or a routing area update message when downlink data is expected. For other implementations, the two bit value instructs the wireless device to refrain from a registration procedure, and in some implementations the registration procedure comprises invoking a tracking area update procedure in a long term evolution context. For still other implementations the registration procedure includes invoking at least one of a routing area update procedure or a combined routing area update procedure in at least one of a GSM or UMTS context, and in other implementations the registration procedure includes initiating at least one of a tracking area update or a routing area update based on guaranteed bit rate criteria. Any of the foregoing implementations of the example method in a wireless device may be combined, without limitation.

Another example mobile station disclosed herein includes hardware and software stored on a tangible computer readable medium that, during operation, causes the mobile station to receive a recovery indicator from a network, and initialize a registration procedure in response to detecting a data connection loss, the registration procedure initialization based on a value of the recovery indicator.

In some implementations, the registration procedure comprises a non-access stratum (NAS) recovery action, wherein the NAS recovery action includes at least one of a tracking area update message, a routing area update message, or a combined routing area update message. In other implementations the recovery indicator is a non-access stratum (NAS) recovery indicator, wherein the NAS recovery indicator includes a two bit value, the registration procedure to be initialized based on the two bit value. In still other implementations, the hardware and software further cause the mobile station to instruct the wireless device to send a tracking area update message in response to detecting the data connection loss, and in some implementations the hardware and software further cause the mobile station to instruct the wireless device to send a routing area update message in response to detecting the data connection loss. For still other implementations, the hardware and software further cause the mobile station to instruct the wireless device to send at least one of a tracking area update message or a routing area update message when downlink data is expected, and in some implementations the hardware and software further cause the mobile station to instruct the wireless device to refrain from a registration procedure. For some implementations, the hardware and software further cause the mobile station to invoke a tracking area update procedure in a long term evolution context, and in other implementations the hardware and software further cause the mobile station to invoke at least one of a routing area update procedure or a combined routing area update procedure in at least one of a GSM or UMTS context. In other implementations, the hardware and software further cause the mobile station to initiate at least one of a tracking area update or a routing area update based on guaranteed bit rate criteria. Any of the foregoing implementations of the example mobile station may be combined, without limitation.

Another example method in a wireless device disclosed herein includes receiving a recovery timer setpoint value from a network, identifying a data connection loss, starting a timer in response to the data connection loss, the UE timer having a value, and initiating a recovery action based on the timer value and the timer setpoint value from the network.

In some implementations, the recovery action includes invoking a recovery when the timer value is less than the timer setpoint value, wherein the recovery action includes a non-access stratum recovery process. While in other implementations the recovery action includes refraining from a recovery when the timer value is more than the timer setpoint value, wherein the recovery action includes a non-access stratum recovery process. Any of the foregoing implementations of the example method in a wireless device may be combined, without limitation.

Another example mobile station disclosed herein includes hardware and software stored on a tangible computer readable medium that, during operation, causes the mobile station to receive a recovery timer setpoint value from a network, identify a data connection loss, start a timer in response to the data connection loss, the UE timer having a value, and initiate a recovery action based on the timer value and the timer setpoint value from the network.

In some implementations, the hardware and software further cause the mobile station to invoke a recovery when the timer value is less than the timer setpoint value, wherein the recovery action comprises a non-access stratum recovery process. In other implementations, the hardware and software further cause the mobile station to refrain from a recovery when the timer value is more than the timer setpoint value, wherein the recovery action comprises a non-access stratum recovery process.

The example methods and apparatus described herein can be used to selectively invoke a non-access stratum (NAS) procedure by a UE, or other device (e.g., wireless devices, clients, terminals, smart phones, personal digital assistants (PDAs), laptop/notebook/netbook computers, desktop computers, etc.) to recover network connectivity. The NAS procedure(s) directed to network connectivity recovery may be referred to herein as NAS recovery, NAS recovery procedures, NAS signaling connection re-establishment, NAS connection procedures, a tracking area update (TAU), and/or a routing area update (RAU). As used herein, the term "a NAS recovery procedure" may include a single instance of recovery procedure activity, or more than one instance of recovery procedure activities, without limitation. In some circumstances, the NAS recovery procedure includes one or more instances in which a TAU message or a RAU message is communicated.

Generally speaking, a NAS recovery procedure is triggered after a radio resource control (RRC) connection re-establishment procedure has failed. The RRC protocol is an access stratum (AS) protocol used for radio related control signaling (e.g., handover commands, connection requests, etc.). The RRC connection re-establishment procedure consumes fewer resources and generates less signaling load on the radio and network signaling interfaces as compared to NAS recovery procedure(s). In some circumstances, a NAS recovery procedure is unnecessary and/or may be delayed to accommodate UEs that have a need for network connectivity. For example, if the UE loses its connection with the network (e.g., an enhanced Node B base station (eNB)), and the UE was not participating in any data transfer at the time of disconnection, then a resource consuming NAS recovery procedure is unnecessary. Accordingly, the example methods and apparatus described herein provide a manner in which to determine whether a NAS recovery procedure should be triggered and to selectively trigger a NAS recovery procedure only when appropriate conditions are met, thereby reducing unnecessary strain on the network (e.g., a 3GPP standards based network, comprising elements such as an EPC, a UMTS core network or a GSM and/or GPRS core network, an E-UTRAN, a UTRAN or a GERAN.

Generally speaking, the example methods and apparatus described herein enable, in part, conditional invocation of NAS recovery procedure(s). As described in further detail below, the example methods and apparatus described herein consider whether the UE that has lost connectivity to a network has any downlink data (e.g., data to be delivered from the network to the UE) expected. The existence of pending downlink data may be determined by, for example, analysis of upper layer information (e.g., upper layer with respect to RRC and/or NAS protocols) available to the UE, such as e-mail applications, file transfer protocol (FTP) applications, browser applications, navigation applications, video telephony applications, etc. Additionally, the existence of pending downlink data may be determined by, for example, analysis of lower layer information (e.g., lower layer with respect to RRC and/or NAS protocols) available to the UE, such as the state of one or more downlink radio link control (RLC) buffers and/or medium access control (MAC) layer state(s). Deciding whether or not to invoke a NAS recovery procedure may also be determined based on, for example, bearer quality of service (QoS) information, a QoS class identifier (QCI), network instructions prior to a loss of connectivity, and/or any number of combinations thereof.

Turning to FIG. 1, an example evolved packet system (EPS) network 100 includes an example UE 102 communicatively connected to an E-UTRAN 104 and/or an EPC network 106 via a radio interface 108. In the illustrated example of FIG. 1, the E-UTRAN 104 includes a first eNB (eNB1 126) and a second eNB (eNB2 128) that control one or more cells 110*a*-*d* that each provide radio coverage over an area. The EPC network 106 includes a mobility management entity (MME) 112 to terminate control plane NAS protocols, a serving gateway (S-GW) 114 to carry user traffic, and a packet data network (PDN) gateway 116 to connect to one or more external packet data networks (e.g., the E-UTRAN 104). An example S1 interface 118 may provide communication between the E-UTRAN 104 and the EPC network 106, such as between one or more eNBs, the MME 112 and/or the S-GW 114.

In the illustrated example of FIG. 1, control signaling 120 (represented by the dashed line) occurs between the UE 102 and eNB1, which is AS signaling. On the other hand, control signaling 122 (represented by the dotted line) occurs between the UE 102 and the MME 112, which is NAS signaling.

In operation, the UE 102 may be in an idle mode or an RRC connected mode. When the UE is in idle mode the UE 102 has no RRC connection to an eNB, such as the eNB1 and/or the eNB2. Additionally, while in the idle mode, there is no signaling connection between the UE 102 and the MME 112, thereby the UE 102 does not consume resources of the EPC network 106. However, the MME 112 may maintain a context for the UE 102 even if none of the eNBs (e.g., eNB1, eNB2) have a context for the UE 102. Generally speaking, a context may include one or more parameters related to the UE 102, such as a subscriber identifier, security keys, temporary identification data, hardware identification data, etc. The context serves as awareness and/or knowledge of one or more UEs that may request services from the EPC network 106 and/or the E-UTRAN 104.

When the UE 102 is in the RRC connected mode, a connection between the UE 102 and an eNB exists, and there may also exist a NAS signaling connection to the MME 112. In this example circumstance, both the MME 112 and the eNB (e.g., eNB1 (126), eNB2 (128)) maintain a context of the UE 102, in which the eNB is responsible for deciding to hand over the UE 102 to a different cell (e.g., 110a-c) and/or a different eNB. When an eNB has a context for a UE, this information is handed off from one eNB to another eNB when the user moves throughout a geographical area. In other words, the E-UTRAN 104 propagates context for each UE 102. During the connected mode (e.g., RRC connected mode), the UE 102 monitors the state of its radio connection with the E-UTRAN 104 and, if a problem with the radio connection is detected, a procedure may be initiated by the UE 102 to re-establish its connection with the E-UTRAN 104. For example, if the UE 102 moves out of a coverage area for a serving cell (e.g., cell 1 110a) and the serving cell 110a had not been able to perform a handover prior to the loss of coverage, the UE 102 may initiate an RRC connection re-establishment procedure, as described in accordance with 3GPP TS 36.331. Example triggers to prompt the UE 102 to initiate the RRC connection re-establishment may include, but are not limited to, a radio link failure (RLF) based on radio quality measurements of a transmission (or lack thereof) from the serving cell (e.g., cell 110a), a handover failure, an inter radio access technology (RAT) failure, an integrity check failure (e.g., an indication of possible security attack), and/or an RRC connection reconfiguration failure (e.g., the network commands the UE to use an invalid/unsupported configuration/feature).

The RRC connection re-establishment procedure causes the UE 102 to locate a suitable cell (e.g., cells 110a-d) and request an RRC connection re-establishment and wait for an RRC connection re-establishment response from an available cell. A successful re-establishment response from an eNB occurs in the event that the eNB has a context associated with the requesting UE 102. In operation, in contrast to a NAS recovery procedure, a successful RRC connection re-establishment request and corresponding successful response from an eNB is performed without overflowing the EPC network 106 with any signaling messages.

In the event that the eNB receiving the RRC connection re-establishment request from the UE 102 returns an RRC connection re-establishment reject message, then the UE 102 returns to an idle mode (RRC Idle). Such a reject message may occur when the eNB has no context for the requesting UE, meaning that the eNB has no knowledge of the requesting UE. After entering the idle mode in response to receiving the RRC connection re-establishment reject message, the UE 102 may initiate a NAS signaling connection re-establishment procedure to recover the connectivity to the network. The NAS signaling connection re-establishment procedure generates a higher (i.e., larger, onerous, or more taxing) signaling load over the radio interface 108, the E-UTRAN 104 elements and the MME 112. In accordance with 3GPP TS 24.301, the UE 102 initiates a TAU procedure to achieve the NAS signaling connection re-establishment, which results in connecting the UE 102 to a new cell/eNB and places the UE 102 in RRC connected mode. In the event that a new cell belongs to a GSM/UMTS network, the UE, in accordance with 3GPP TS 24.008, initiates a RAU rather than a TAU procedure to achieve NAS signaling re-establishment and connect the UE to a new cell/RNC/BSC/SGSN.

The example methods and apparatus described herein allow, in part, the UE 102 to initiate a NAS re-establishment procedure, or more than one NAS re-establishment procedure, as described above, based on one or more conditions. As described in further detail below, the UE 102 includes a NAS establishment initiator 150 to determine whether a NAS re-establishment procedure should be initiated based on, in part, uplink data status information, downlink data status information, guaranteed bit rate bearer status information, bearer quality metrics information and/or network information.

Figure 2:
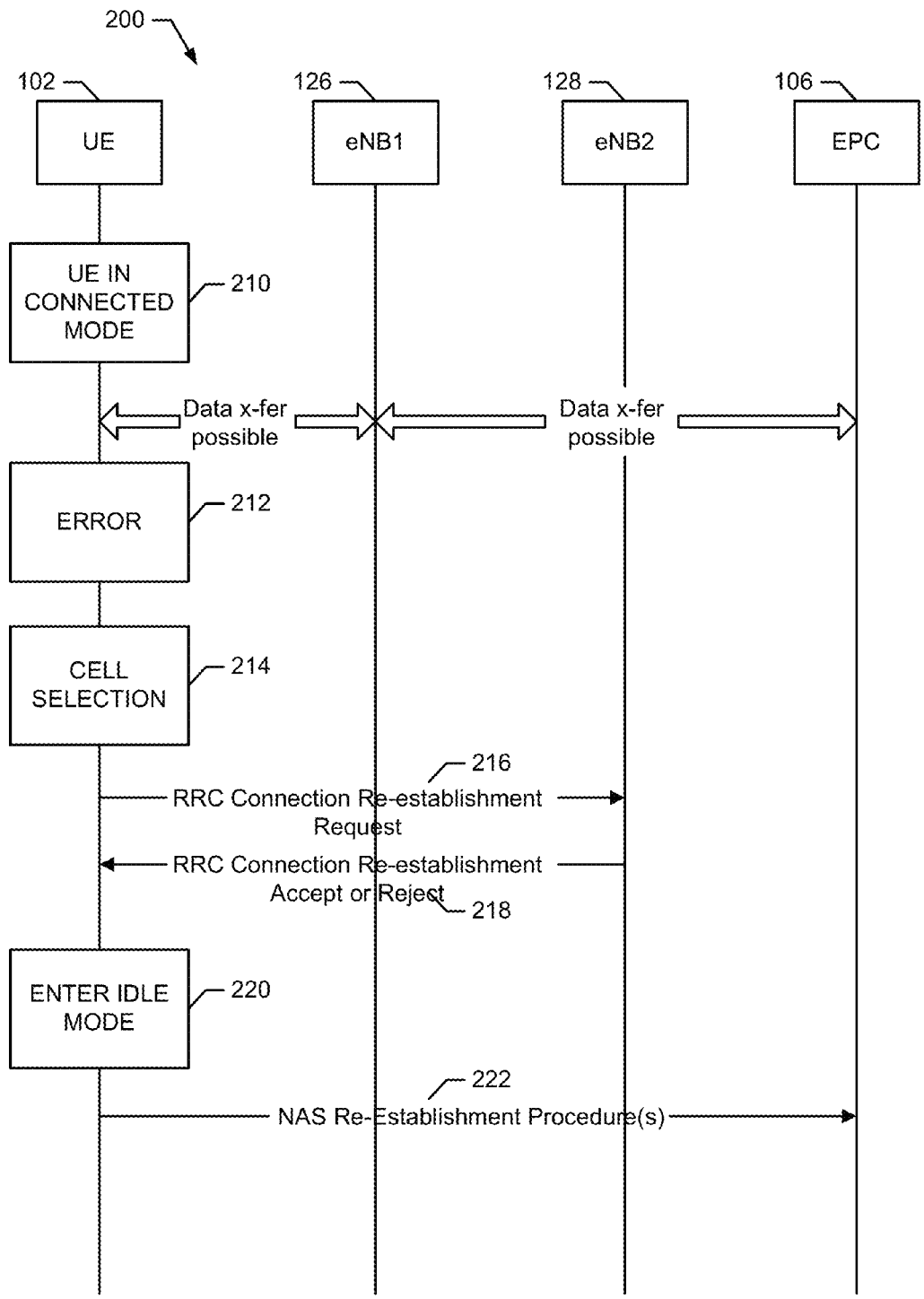
FIG. 2 depicts an example message sequence that may occur between user equipment and one or more network elements of FIG. 1.

Turning to FIG. 2, an example message sequence 200 is shown that may occur when the UE 102 is initially connected to eNB1 (126) and experiences an error condition, such as RLF. The sequence 200 includes a UE 102, eNB1 126, eNB2 128 and a core network, such as the EPC network 106 of FIG. 1. In operation, the UE 102 is initially in RRC connected mode 210, which permits data transfers between the UE 102 and eNB1 126 and the core network 106. However, after the UE 102 experiences a connectivity error 212, such as RLF, the UE 102 selects a cell 214 and attempts to re-establish the RRC connection via an RRC connection re-establishment request message 216 to eNB2 128. As described above, the RRC connection re-establishment request message 216 is part of the AS protocol, thereby avoiding any unnecessary communication with the EPC network 106. If the UE 102 had selected another node/cell having a context associated with the requesting UE 102, then an RRC connection re-establishment success message 218 would have been returned by the other node/cell.

However, in the example of FIG. 2, if eNB2 128 has no context associated with the UE 102 and, as a result, returns an RRC connection re-establishment reject message 218. The UE 102 enters an idle mode 220. So far, the example message sequence 200 of FIG. 2 has involved only AS protocols, thereby avoiding any signaling contact with the core network 106. Further to entering the idle state 220 due to the reception of the reject message 218, the UE 102 initiates a NAS signaling connection re-establishment 222 via eNB2 128 so that the UE 102 may return to the RRC connected mode.

Figure 3A:
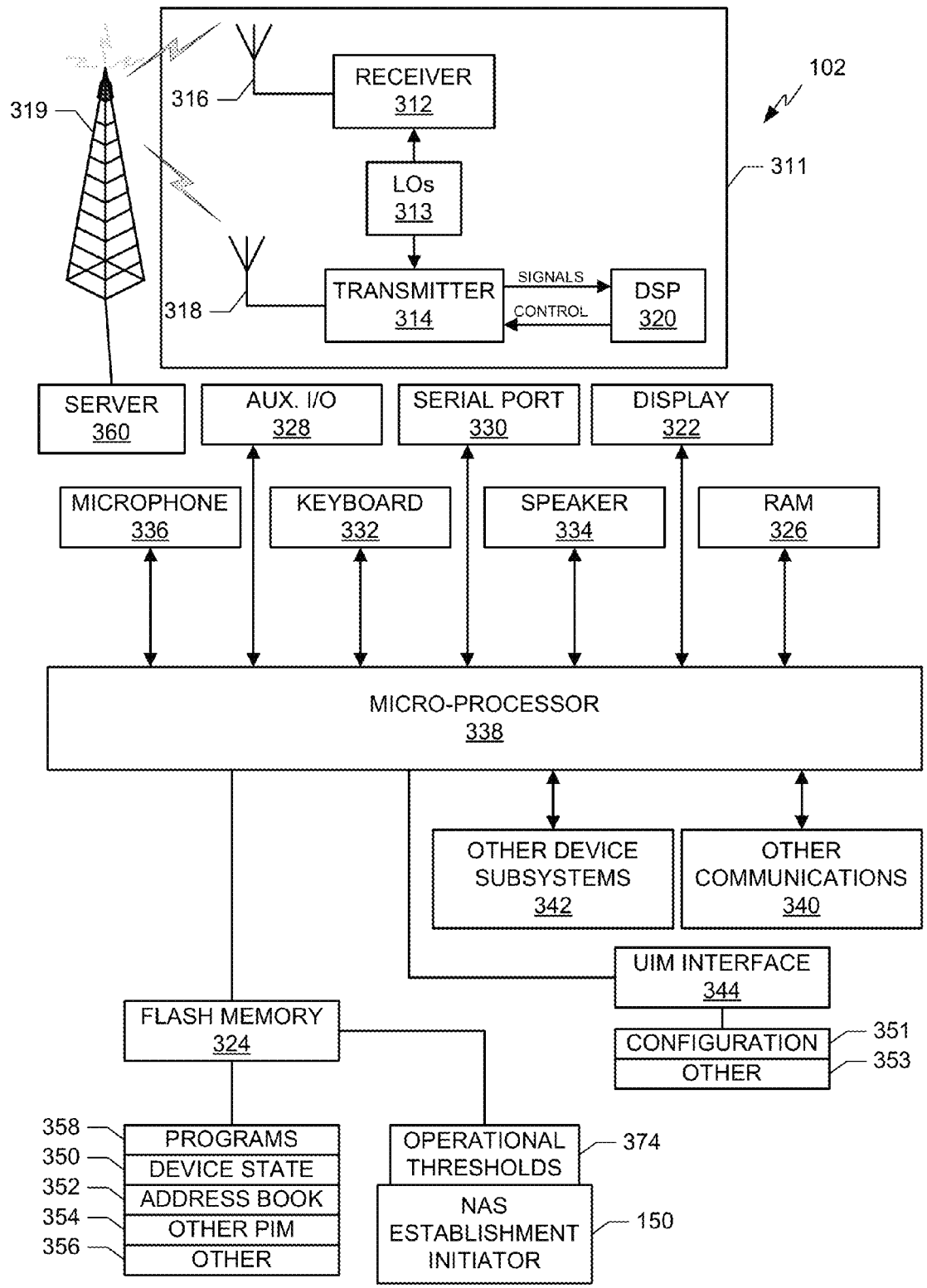
FIG. 3A depicts an example user equipment that can be implemented in accordance with this disclosure.

FIG. 3A is an example of the UE 102 of FIG. 1 that can be implemented in accordance with this disclosure. UE 102 is preferably a two-way wireless communication device having at least voice and data communication capabilities. UE 102 preferably has the capability to communicate with other computer systems on a network, an intranet, and/or the Internet. Depending on the exact functionality provided, the wireless device (e.g., the UE 102) implemented as a single unit such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the wireless device (e.g., the UE 102) may be a multiple-module unit comprising a plurality of separate components, including but not limited to a computer or other device connected to a wireless modem.

Where UE 102 is enabled for two-way communication, it will incorporate a communication subsystem 311, including both a receiver 312 and a transmitter 314, as well as associated components such as one or more, preferably embedded or internal, antenna elements 316 and 318, local oscillators (LOs) 313, and a processing module such as a digital signal processor (DSP) 320. The particular design of the communication subsystem 311 will be dependent upon the communication network in which the device is intended to operate. For example, UE 300 may include a communication subsystem 311 designed to operate within a 2G network, a 3G network, a fourth generation (4G) network, the general packet radio service (GPRS) network, a universal mobile telecommunications system (UMTS) network, a long term evolution (LTE) network, a code division multiple access (CDMA) network, etc.

Network access requirements will also vary depending upon the type of network 319. For example, in UMTS, GPRS and/or LTE networks, network access is associated with a subscriber or user of the UE 102. For example, a GPRS mobile device therefore requires a subscriber identity module (SIM) card in order to operate on a GPRS network. In UMTS a universal subscriber identity module (USIM) or SIM module is required. However, in CDMA a removable user identity module (RUIM) card or module is required. These will be referred to as a UIM interface herein. Without a valid UIM interface, a mobile device (also referred-to herein as user equipment (UE) or a mobile station (MS)) may not be fully functional. Local or non-network communication functions, as well as legally required functions (if any) such as emergency calling, may be available, but mobile device 102 will be unable to carry out any other functions involving communications over the network. The UIM interface 344 is normally similar to a card-slot into which a card can be inserted and ejected like a diskette or PCMCIA card. The UIM card can have approximately 64K of memory and hold many key configuration 351, and other information 353 such as identification, and subscriber related information.

When required network registration or activation procedures have been completed, UE 300 may send and receive communication signals over the network 319 (e.g., the example E-UTRAN 104 and/or the example EPC network 106 of FIG. 1). Signals received by an antenna 316 through the communication network 319 are input to a receiver 312, which may perform such common receiver functions as signal amplification, frequency down conversion, filtering, channel selection and the like, including analog to digital (A/D) conversion. A/D conversion of a received signal allows more complex communication functions such as demodulation and decoding to be performed in the DSP 320. In a similar manner, signals to be transmitted are processed, including modulation and encoding for example, by DSP 320 and input to transmitter 314 for digital to analog conversion, frequency up conversion, filtering, amplification and transmission over the communication network 319 via the antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Network 319 may further communicate with multiple systems, including a server 360. For example, network 319 may communicate with both an enterprise system and a web client system to accommodate one or more clients with one or more service levels.

UE 102 includes a microprocessor 338 which controls the overall operation of the device. Communication functions, including at least data communications, are performed through communication subsystem 311. Microprocessor 338 also interacts with further device subsystems such as the display 322, flash memory 324, random access memory (RAM) 326, auxiliary input/output (I/O) subsystems 328, serial port 330, keyboard 332, speaker 334, microphone 336, a short-range communications subsystem 340 and any other device subsystems generally designated as 342.

Some of the subsystems shown in FIG. 3A perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list.

Operating system software used by the microprocessor 338 may be stored in a persistent store such as flash memory 324, which may instead be a read-only memory (ROM) or similar storage element (not shown). The operating system, specific device applications, or parts thereof, may be temporarily loaded into a volatile memory such as RAM 326. Received communication signals may also be stored in RAM 326. Further, a unique identifier is also preferably stored in read-only memory.

As shown in FIG. 3A, flash memory 324 can be segregated into different areas for both computer programs 358 and program data storage 350, 352, 354 and 356. These different storage types indicate that each program can allocate a portion of flash memory 324 for their own data storage requirements. The flash memory 324 additionally includes a NAS establishment initiator 150 and an operational thresholds module 374. As described in further detail below, the example NAS establishment initiator 150 identifies one or more conditions of the UE 102 associated with a loss of connectivity with one or more networks. The NAS establishment initiator 150 may operate in a manner consistent with one or more standards such as, but not limited to TS 24.008, TS 24.301 and/or TS 36.331. Generally speaking, in the event that the UE 102 detects a loss of communication, the UE 102 bases its decision on whether to initiate a NAS procedure in view of (a) whether downlink user data is expected, (b) type(s) of bearer quality of service condition(s), (c) network information and/or instructions prior to a moment of failure, and/or any combination thereof.

Figure 3B:
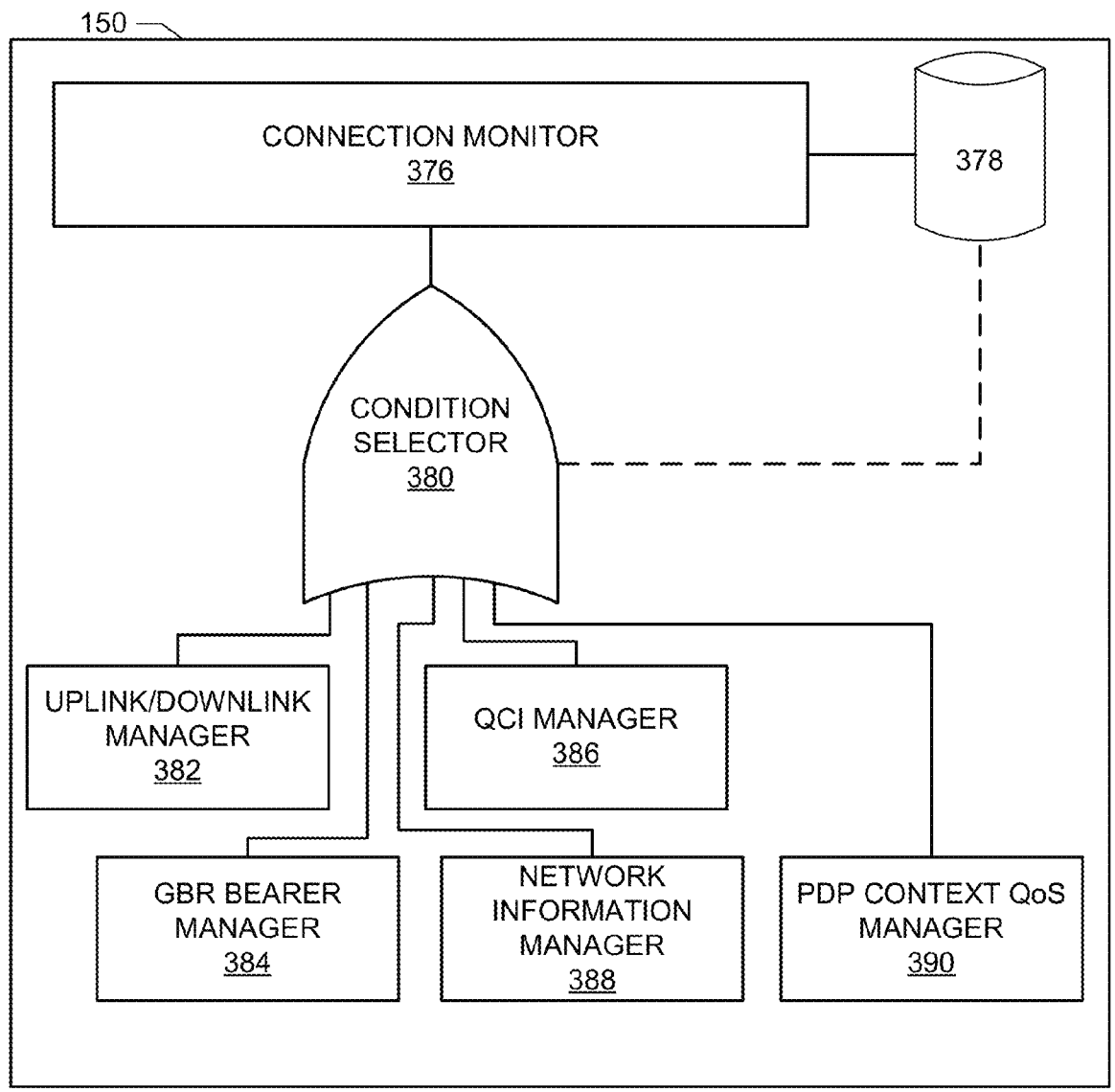
FIG. 3B depicts an example establishment initiator that can be implemented in accordance with this disclosure.

FIG. 3B is a block diagram of the example NAS establishment initiator 150 shown in FIGS. 1 and 3A. The NAS establishment initiator 150 of FIG. 3B includes a connection monitor 376, a UE recovery profile data store 378, a condition selector 380, an uplink/downlink manager 382, a GBR bearer manager 384, a QCI manager 386, a network information manager 388, and a packet data protocol (PDP) context QoS manager 390. In operation, the NAS establishment initiator 150 employs the connection monitor 376 to monitor the UE 102 for a connection status, such as a current connection mode, an instance where the connection mode changes, and/or circumstances where the UE 102 has lost communication capabilities with a previously connected network. In response to a trigger related to UE 102 connectivity with the network (e.g., UE connection to eNB1 lost, UE mode change from LTE to non-LTE mode, UE in state EMM_REGISTERED, etc.), the connection monitor 376 accesses the UE recovery profile data store 378 to determine which conditions are to be considered when deciding whether to initiate a NAS recovery procedure.

In some examples, the UE recovery profile data store 378 indicates that information related to pending uplink data and/or expected downlink data is relevant to a decision to invoke a NAS recovery procedure, so the UE recovery profile data store 378 provides the condition selector 380 with a control signal to activate the example uplink/downlink manager 382. The uplink/downlink manager 382 may analyze one or more protocol layers to ascertain the presence of pending uplink data and/or analyze one or more protocol layers to ascertain or otherwise estimate whether downlink data is expected from the network, as described in view of FIGS. 6-8 below.

In other examples, the UE recovery profile data store 378 indicates that information related to bearer types is relevant to a decision to invoke a NAS recovery procedure. As a result, the UE recovery profile data store 378 provides the condition selector 380 with a control signal to activate the GBR bearer manager 384. The GBR bearer manager 384 may analyze one or more established bearers to determine, for example, whether such bearers facilitate a guaranteed bit rate. Based on the type(s) of established bearers, the GBR bearer manager 384 may determine whether to initiate a NAS recovery procedure, as described in view of FIGS. 9 and 10 below.

In still other examples, the UE recovery profile data store 378 indicates that information related to quality of service information and/or quality of service class identifiers (QCI) are relevant to a decision to invoke a NAS recovery procedure. As a result, the UE recovery profile data store 378 provides the condition selector 380 with a control signal to activate the QCI manager 386. The QCI manager 386 may analyze established bearer(s) and/or UE 102 context information to determine, for example, whether bearer contexts are or were activated and/or whether the established (or to be established) bearer(s) have specific QCI value(s) and/or are within threshold range values, as described in further detail in view of FIGS. 11 and 12 below. For circumstances of GSM/UMTS environments, the UE recovery profile data store 378 provides the condition selector 380 with a control signal to activate the PDP context QoS manager 390. For example, the PDP context may contain information indicative of QoS criteria including, but not limited to, a reliability class, a precedence class, traffic handling priorit(ies), and others as described in further detail below.

Still other examples include the UE recovery profile data store 378 indicating that information related to one or more network parameters are relevant to a decision to invoke a NAS recovery procedure. As a result, the UE recovery profile data store 378 provides the condition selector 380 with a control signal to activate the network information manager 388. The network information manager 388 determines whether one or more instructions, parameters, bits and/or flags have been provided to the UE 102 from the network (e.g., the EPC core network 106, the E-UTRAN 104, etc.). Flags may include, but are not limited to NAS recovery indicator(s) and/or NAS recovery timer(s), as described in further detail below.

Without limitation, the UE recovery profile data store 378 may indicate that more than one condition is relevant to a decision to invoke a NAS recovery procedure. As a result, the UE recovery profile data store 378 may provide the condition selector 380 with a control signal to activate two or more of the uplink/downlink manager 382, the GBR bearer manager 384, the QCI manager 386 and/or the network information manager 388.

Figure 4:
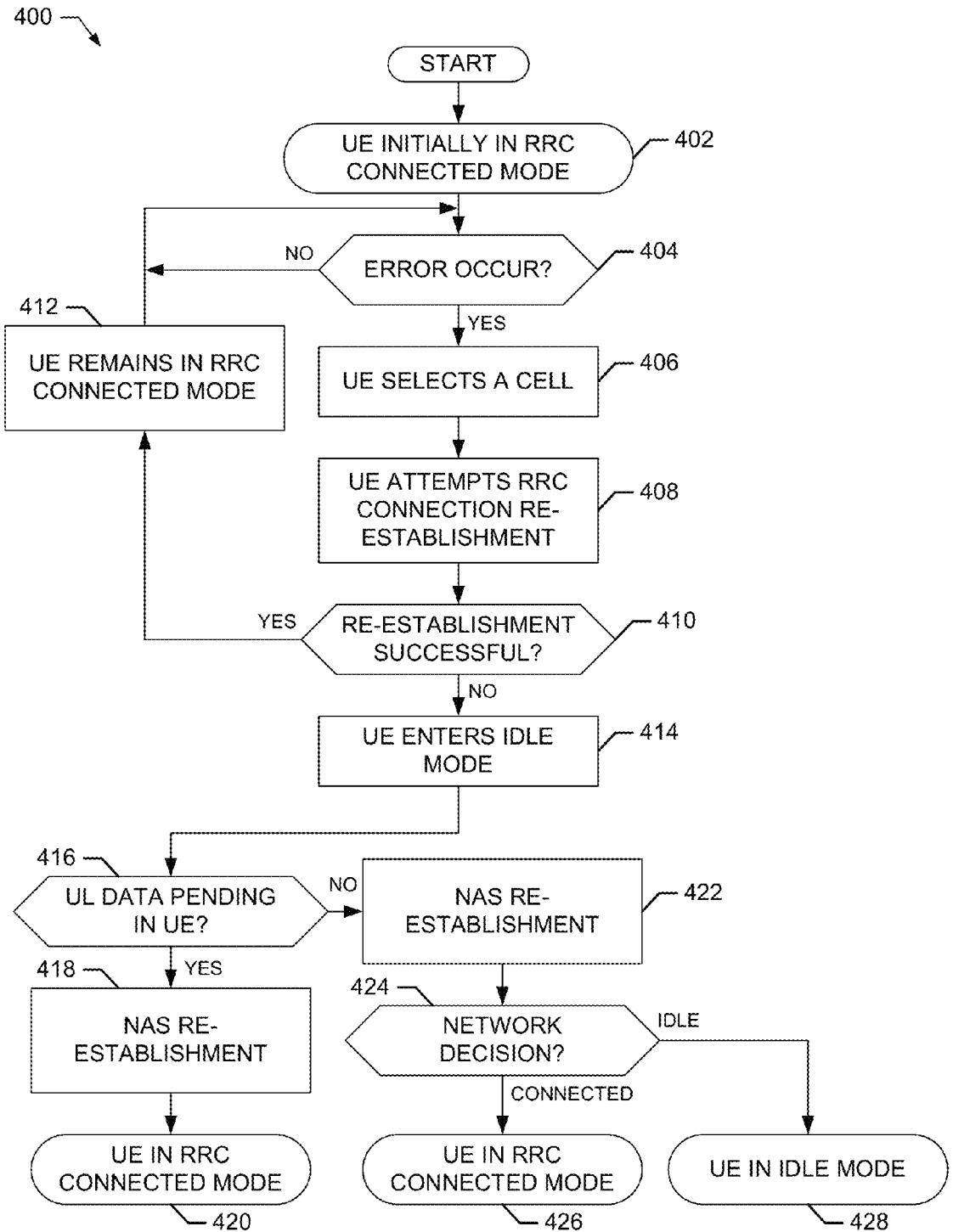
FIGS. 4, 5A, 5B and 6-12 depict flowcharts of example processes for facilitating conditional invocation of network recovery.

FIG. 4 depicts a flow diagram representative of an example process 400 that may be implemented using computer readable instructions to monitor for and respond to instances of UE connection losses within the EPS network 100. The example process of FIG. 4, and the example processes of FIGS. 4, 5A, 5B and 6-12 described in further detail below, may be performed using a processor, a controller and/or any other suitable processing device. For example, the process of FIGS. 4, 5A, 5B and 6-12 may be implemented using coded instructions (e.g., computer readable instructions) stored on a tangible computer readable medium such as a flash memory, a read-only memory (ROM), and/or a random-access memory (RAM).

Alternatively, the process of FIGS. 4, 5A, 5B and 6-12 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the processes of FIGS. 4, 5A, 5B and 6-12 may be implemented manually or as any combination(s) of any of the foregoing techniques, for example, any combination of firmware, software, discrete logic and/or hardware. Further, although the process of FIGS. 4, 5A, 5B and 6-12 is described with reference to the flow diagram of FIGS. 4, 5A, 5B and 6-12, other methods of implementing the processes of FIGS. 4, 5A, 5B and 6-12 may be employed. For example, the order of execution of the blocks may be changed, and/or some of the blocks described may be changed, eliminated, sub-divided, or combined. Additionally, any or all of the operations of the processes of FIGS. 4, 5A, 5B and 6-12 may be performed sequentially and/or in parallel by, for example, separate processing threads, processors, devices, discrete logic, circuits, etc.

In the illustrated example of FIG. 4, the UE, such as the UE 102 of FIG. 1, is initially in RRC connected mode (block 402). If no connectivity error occurs (block 402), the UE 102 stays in the RRC connected mode. On the other hand, when the UE 102 experiences an error (block 404) (e.g., a radio link failure as described above), the UE 102 selects an available cell (block 406) and initiates an RRC connection re-establishment procedure (block 408). If the cell (e.g., an eNB) responds with a message indicative of success (block 410), then the UE 102 remains in the RRC connected mode (block 412), otherwise it enters the idle mode (block 414).

After entering the idle mode (block 414), the UE 102 determines whether there is any uplink data pending in the UE for delivery to the network (block 416). If so, then for circumstances including E-UTRAN, the example UE 102 initiates a NAS re-establishment procedure (block 418), such as a Service Request procedure, a TAU procedure to place the UE 102 in RRC connected mode (block 420). The presence of uplink data to be sent in the UE 102 indicates that the UE 102 may have been actively communicating with the network (e.g., the E-UTRAN 104 and/or the EPC network 106). Accordingly, attempting to re-establish an instance of a lost communication (e.g., further to an RLF) is appropriate to resume an on-going transfer of voice and/or data. However, in the event that there is no uplink data pending in the UE 102 (block 416), then the UE 102 still proceeds to initiate a NAS re-establishment procedure (block 422) so that the previously connected network can decide (block 424) whether the UE 102 should reside in RRC connected mode (block 426), or RRC idle mode (block 428).

In some circumstances, a UE that has lost communication with the network and has no corresponding uplink data pending causes unnecessary network signaling traffic towards the EPC network 106 via NAS re-establishment procedure(s). In other words, triggering a NAS re-establishment procedure can waste network resources. The unnecessarily triggered NAS re-establishment procedure may further cause resource consumption strain on the EPC network 106 leading to, for example, longer network latency, reduced signal quality and/or generally poor performance for other UEs connected to the same network. For example, if a passenger train enters a tunnel and the passengers lost their corresponding connections to the network, the example process 400 of FIG. 4 causes each passenger's UE to initiate a NAS re-establishment procedure when the train exits the tunnel. As such, a NAS re-establishment procedure will occur even for UEs not involved in an active transfer of data (e.g., web browsing, phone call, etc.). The methods and apparatus described herein conditionally invoke NAS re-establishment procedure(s) based on one or more indications that such procedures are needed by the UE, thereby minimizing and/or eliminating circumstances of wasted bandwidth consumption and unnecessary resource strain.

Figure 5A:
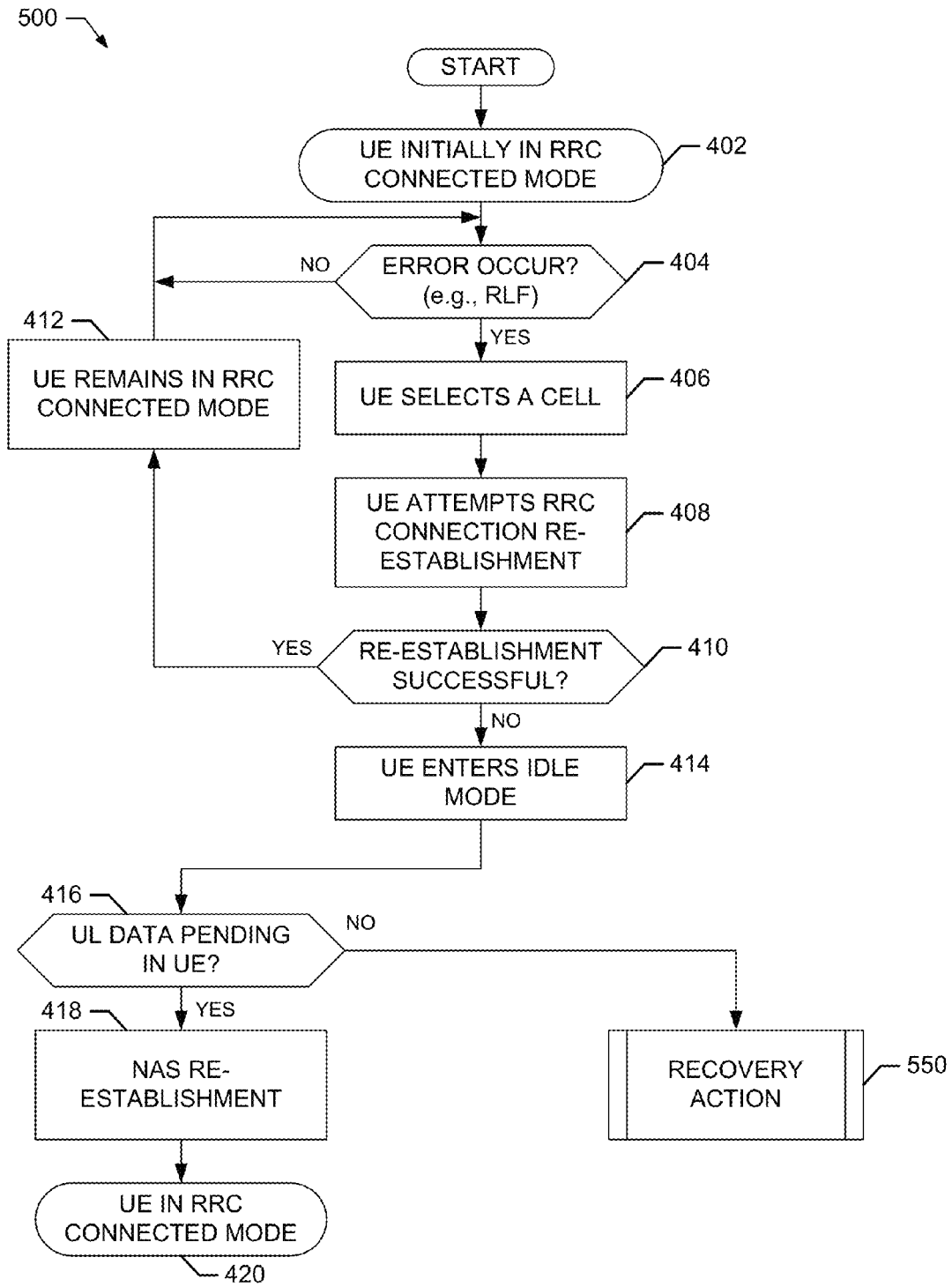

FIG. 5A depicts a flow diagram representative of an example process 500 that may be implemented using computer readable instructions to respond to instances of UE connection losses within the EPS network 100. The illustrated example of FIG. 5A is similar to the example process 400 of FIG. 4 and includes similar element nomenclature where appropriate. Similarities will not be described in further detail. Differences between the example of FIG. 4 and the example of FIG. 5A include, but are not limited to one or more aspects directed to whether uplink data is pending in the UE 102 (block 416).

In the illustrated example of FIG. 5A, the process 500 determines whether there is any uplink data pending in the UE for delivery to the network (block 416), as described above. If so, then the UE 102 initiates a NAS re-establishment procedure (block 418), such as a Service Request procedure, or a TAU procedure (e.g., in circumstances of an E-UTRAN target cell) to place the UE 102 in RRC connected mode (block 420). The presence of uplink data in the example UE 102 indicates that the UE 102 may have been actively communicating with the network (e.g., the example E-UTRAN 104 and/or the example EPC network 106). Accordingly, one or more attempts to re-establish an instance of lost communication (e.g., an RLF) are appropriate to facilitate an on-going transfer. However, in the event that there is no uplink data pending in the UE 102 (block 416), then the UE 102 initiates a recovery action (block 550). As described in further detail below, the recovery action (block 550) may evaluate one or more aspects of the UE 102, the network (e.g., the EPS network 100), and/or any combination thereof to determine whether initiating a NAS re-establishment procedure(s) is necessary.

Figure 5B:
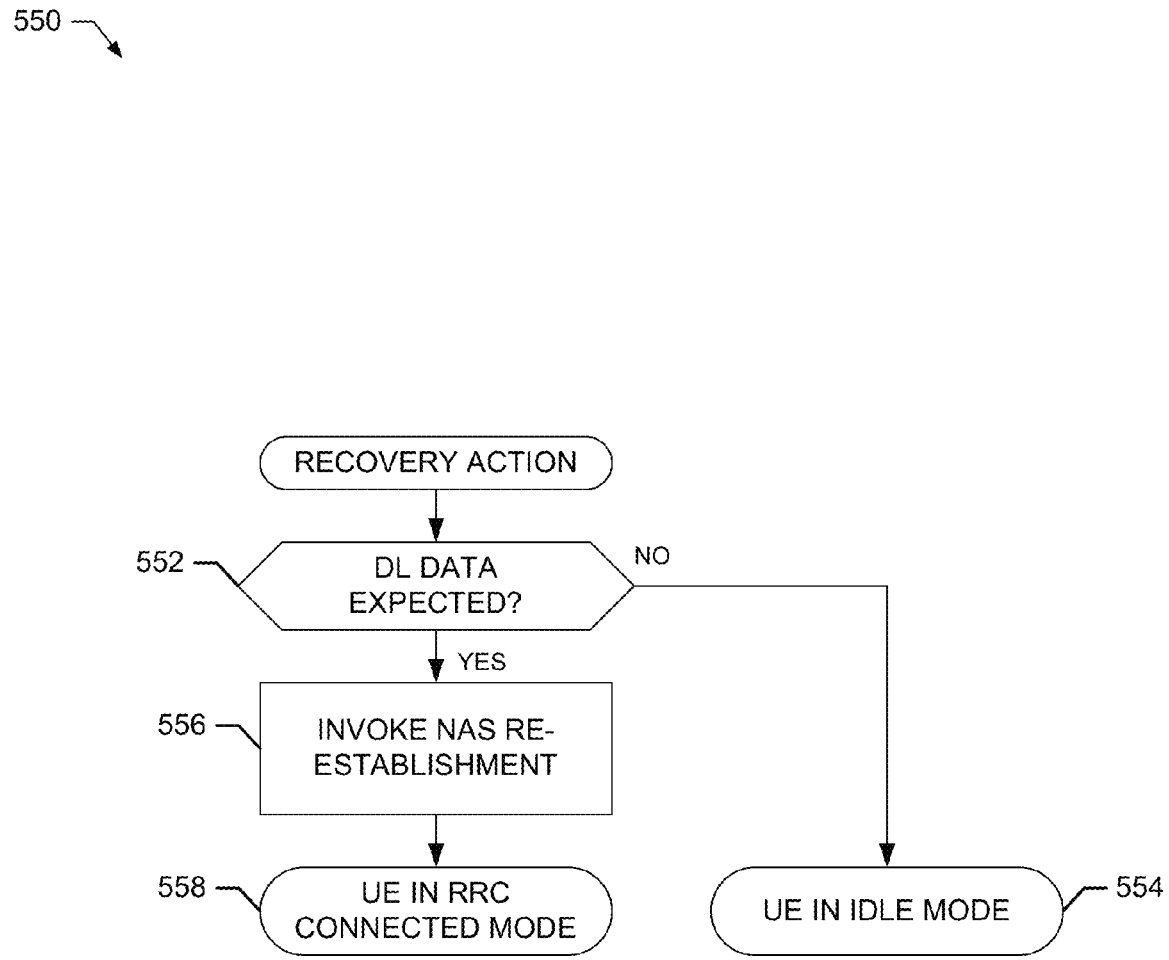

FIG. 5B depicts a flow diagram representative of an example process 550 of FIG. 5A that may be implemented using computer readable instructions to invoke a recovery action of the UE 102 when connection to the network is lost. In the illustrated example of FIG. 5B, if the UE 102 determines that downlink (DL) data is not expected (block 552), then the NAS re-establishment procedure may be avoided and the UE may stay in an idle mode (block 554). At least one benefit to refraining from invoking the NAS re-establishment procedure is that the EPS network 100 experiences less signaling traffic than would otherwise occur. For example, a population of UEs that do not have ongoing data activity will not contribute to any signaling load on the EPC network 106, and reduce the probability of an overload situation. Additionally, refraining from unnecessarily sending additional uplink messages improves battery life for the UE 102. On the other hand, in the event that the UE 102 determines that DL data is expected (block 552), then the UE 102 invokes the NAS re-establishment procedure (block 556) to connect to the EPC network 106, thereby allowing the expected DL data to reach the UE 102. After having successfully performed the NAS re-establishment procedure (block 556), the UE 102 resides in RRC connected mode (block 558).

DL data is typically queued within a network, and the network itself can know whether there is DL data pending for a UE. However, without communication between the UE and the network, such as when the UE 102 loses connectivity with the E-UTRAN 104, the UE 102 may estimate whether DL data is expected. Estimating whether DL data is expected may occur through the use of upper layer information and/or lower layer information. As used herein, 'upper layer information' is information above one or more layers associated with RRC and/or NAS protocols. Additionally, as used herein, 'lower layer information' is information below one or more layers associated with RRC and/or NAS protocols.

Upper layer information used by the UE to determine whether DL data is expected may include, but is not limited to a state of an application or a state of an upper layer protocol. Applications may include, but are not limited to electronic mail (e-mail) applications that know further messages are waiting to be retrieved, file transfer protocol (FTP) applications that know files are waiting to be retrieved, browser applications that are currently active and, thus, know further HTTP objects are to be received, and/or navigation applications that are involved with map data reception associated with one or more active navigation efforts. Additionally, the state of the upper layer protocol may include one or more pending acknowledgement or acknowledgement messages (e.g., an ACK or NACK), for example the upper layer protocol may have transmitted some data and be expecting the reception on an ACK/NACK response or may have transmitted a NACK and be expecting retransmission of the corresponding data. Without limitation, an application layer may be chartered with the responsibility of monitoring one or more applications for one or more indications. The application layer may monitor a single application or any number of applications. The application layer could be executable code separate from one or more applications as described above (e.g., e-mail applications, ftp applications, mapping applications, etc.).

Lower layer information used by the UE to determine whether DL data is expected may include, but is not limited to a state of the RLC layer when an RRC connection was released, or a state of a medium access control (MAC) layer when the RRC connection was released. Generally speaking, NAS has at least two (2) layers below it. One is the MAC layer and if there is data queued in the MAC layer, then this information can be used to determine if further data is to be expected. A second is the RLC layer, which sits above the MAC layer and is responsible for re-transmission protocol(s). As such, information from this layer may be indicative of expected DL data. For example, one or more UE buffers, such as a DL RLC buffer may contain data to suggest that more DL data is to be expected. As a more specific example, the DL RLC buffer may contain a sequence of data with a gap in the sequence and, as such, it can be expected that the network will retransmit the missing data to fill the gap. In another example, the RLC layer may have transmitted some data and be expecting the reception on an ACK/NACK response or may have sent a NACK, but corresponding data has not yet been received, which suggests additional DL data is to be expected, thereby justifying the use of the NAS re-establishment procedure. In still other examples of using lower layer information as an indication of whether DL data is expected, if the UE MAC layer was not in a discontinuous reception (DRX) mode (e.g., a power save mode, DRX mode is "false," DRX mode "not active") before an RRC connection re-establishment procedure, then the UE was not in a power save mode and may have been attempting to send/receive data. The UE MAC layer may determine that it is in a DRX mode (e.g., DRX mode is "active," DRX mode is "true") by determining that a DRX inactivity timer is not running or has expired. The RLC layer and MAC layer may be referred to as sub-layers of layer 2. Within the RLC layer or RLC sub-layer, there may be one or more RLC sub-layer entities in which each entity may be an instance of the RLC protocol. Within the MAC layer or MAC sub-layer there may be one or more MAC sub-layer entities where each entity may be an instance of the MAC protocol.

In some circumstances, the example application layer information may be more reliably indicative of pending data than the lower layer information available to the UE 102. For example, one or more lower layers may be in a temporary state of inactivity when, in fact, the higher level application layer information may have an indication that DL data is expected. Expected DL data from an application may be identified from application parameters, such as periodic timers to retrieve network data to satisfy application objectives (e.g., to communicate a location to a user on a GPS enabled map every 5-seconds). The application layer may use any nomenclature to indicate that DL data is expected including, but not limited to "UE expecting downlink user data," "Likely to have downlink user data pending," "Previously/future downlink user data pending," "Downlink data pending" and/or "Downlink user data pending."

Figure 6:
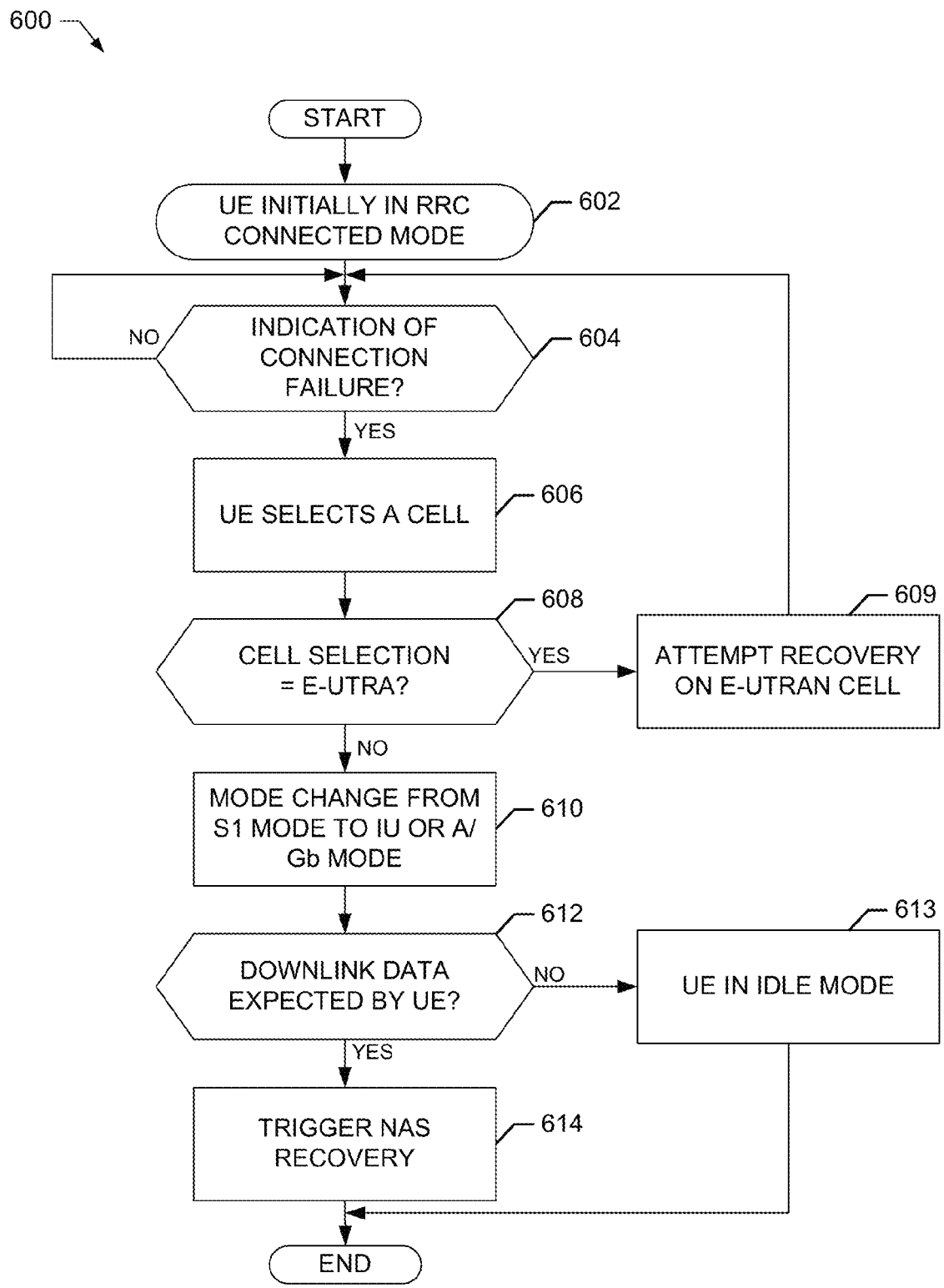

FIG. 6 depicts a flow diagram representative of an example process 600 that may be implemented using computer readable instructions to trigger the NAS recovery procedure after a UE data connection loss. In some examples, the process 600 may be referred to as a routing area updating (RAU) procedure in accordance with TS 24.008, section 4.7.5. Additionally or alternatively, the example process 600 may be referred to as a combined routing area updating procedure initiation in accordance with TS 24.008, section 4.7.5.2.1. In the illustrated example of FIG. 6, the UE, such as the UE 102 of FIG. 1, is initially in RRC Connected mode (block 602). If no connectivity error occurs (block 604), the UE 102 stays in the RRC Connected mode. However, when the UE 102 experiences an error (block 604), the UE 102 selects an available cell (block 606). The indication of the connection failure (block 604) may be received from lower layers due to, for example, one or more lower layer failure(s) while the UE 102 was on a E-UTRA cell or in S1 mode. Additionally or alternatively, a GPRS mobility management (GMM) protocol may receive an indication of RRC connection failure from one or more lower layers (block 604). As described above, the indication of connection failure(s) (block 604) may be based on information from the upper layer, such as the application layer.

If the UE 102 selects an E-UTRA cell (block 608), then the process 600 continues to attempt recovery of the connection on the E-UTRAN cell (block 609). Otherwise a mode change occurs from an LTE mode (also referred to as "S1" mode or E-UTRA) to a non-LTE mode (block 610). Non-LTE modes may include, but are not limited to UMTS based mode(s) (e.g., Iu mode), global system for mobile communications (GSM) based mode(s), and/or GSM-Edge based mode(s) (e.g., A/Gb mode).

After the mode change (block 610), the UE 102 determines whether downlink data is expected (block 612). If not, then there is neither uplink data nor downlink data, which means there is no motivation to trigger the NAS recovery procedure and the example UE 102 of FIG. 6 enters idle mode (block 613). Idle mode may include, for example, packet idle mode (in circumstances of GERAN target cells) or RRC idle (in circumstances of UTRAN target cells). Otherwise, if there is downlink data expected by the UE 102 (block 612), then the NAS recovery procedure is triggered (block 614). The NAS recovery procedure is performed on the non E-UTRA cell such as, for example, on a GSM or UMTS cell. The NAS recovery procedure may be a RAU, a combined RAU, or a Service Request procedure. The NAS recovery procedure will place the UE in a connected mode, such as, for example, in RRC connected mode (case of E-UTRAN target cell) or in packet transfer mode (case of GERAN target cell).

Figure 7:
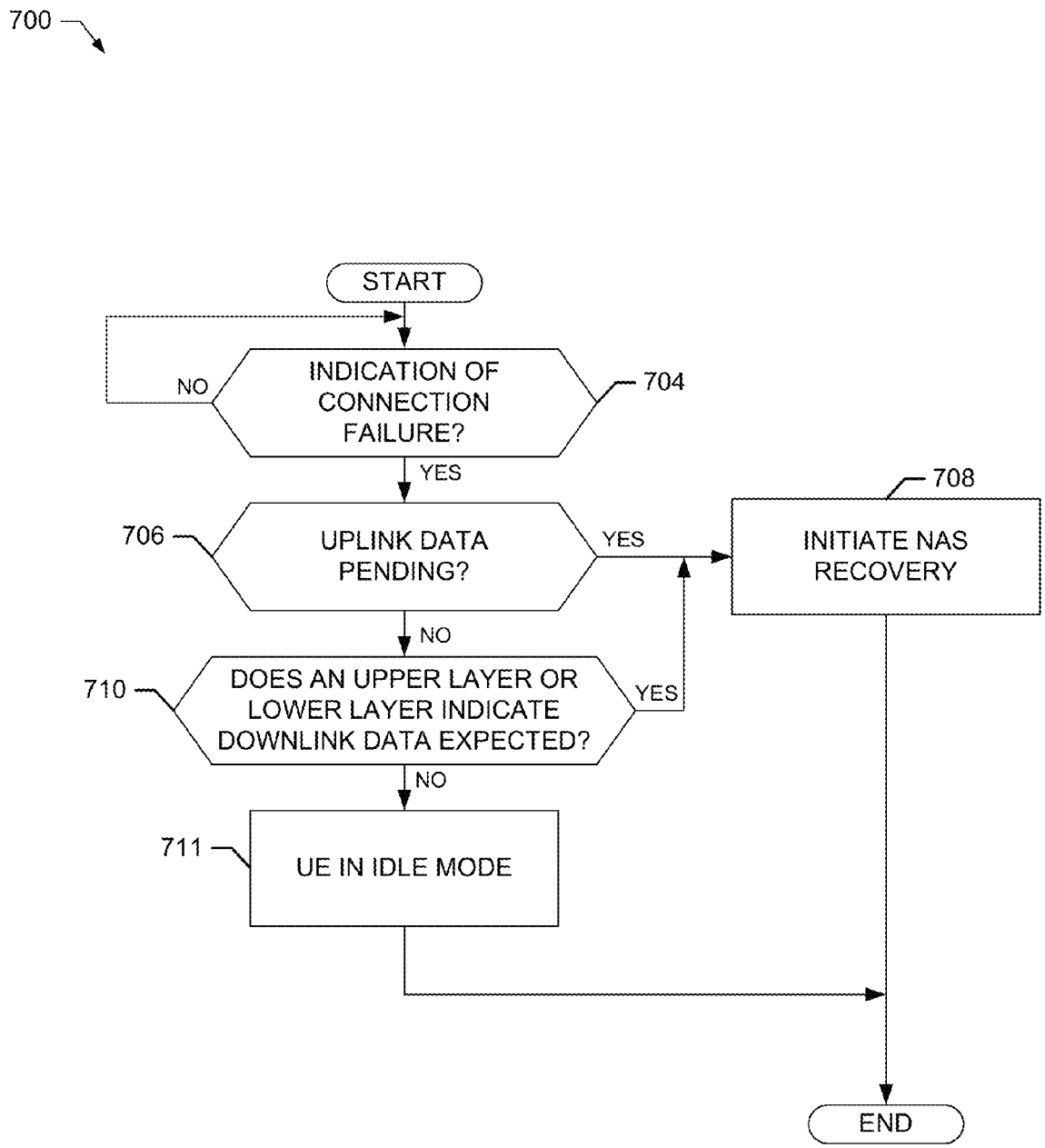

FIG. 7 depicts a flow diagram representative of an example process 700 that may be implemented using computer readable instructions to trigger a NAS recovery procedure after a UE data connection loss. In some examples, the process 700 may be referred to as normal and periodic tracking area updating procedure initiation in accordance with TS 24.301, section 5.5.3.2.2. In the illustrated example of FIG. 7, a UE monitors its state to determine if it is in EMM-REGISTERED (block 702). Generally speaking, EPS mobility management (EMM) states describe a mobility management status in response to the NAS mobility management procedure (e.g., Attach, TAU, etc.), and provide an indication of the signaling connectivity between the UE 102 and the EPC network 106. While several types of EMM states exist, a state of EMM-REGISTERED occurs when the UE successfully registers via an Attach procedure to the E-UTRAN 104 or other network. The UE 102 and the MME 112 enters the EMM-REGISTERED state by, for example, a successful TAU procedure for a UE that selects an E-UTRAN cell (e.g., cell 1 through cell 4). While in the EMM-REGISTERED state, the UE 102 may receive services that require registration in the EPS network 100. Although the example process 700 of FIG. 7 describes monitoring for whether or not EMM-REGISTERED state is true (block 702), other EMM states may be monitored, without limitation. For example, EMM states include, but are not limited to EMM-NULL, EMM-DEREGISTERED, EMM-REGISTERED-INITIATED, EMM-DEREGISTERED-INITIATED, EMM-TRACKING-AREA-UPDATING-INITIATED and EMM-SERVICE-REQUEST-INITIATED.

The UE 102 determines whether there is an indication of a connection failure (block 704). In the event that the UE does not receive an indication of a connection failure (block 704), then the UE 102 continues to monitor for an indication of failure (block 704). However, in the event that the UE receives an indication of a connection failure (block 704), the UE (e.g., UE 102) determines whether uplink data is pending (block 706). If so, then the UE 102 initiates NAS recovery (block 708). The NAS recovery procedure may be a TAU procedure, a RAU procedure or a Service Request procedure. The TAU procedure (block 708) may include sending a TRACKING AREA UPDATE REQUEST message to an MME, such as the MME 112 of FIG. 1.

In the event that the UE 102 does not have user uplink data (sometimes referred to as uplink user data) pending (block 706), then the UE 102 determines whether an upper layer or a lower layer includes an indication of expected downlink data (block 710). If not, then the UE 102 enters idle mode (block 711). However, if the UE 102 determines that the upper layer or lower layer includes an indication of expected downlink data (block 710), then the UE 102 initiates the NAS recovery procedure (block 708). As described above, while one or more lower layers may not include an indication of expected downlink data (e.g., a lower layer buffer is empty), the upper layer may include one or more indications of expected downlink data. In some examples, the upper layer executes one or more applications that may execute on the UE 102. An application that, for example, attempts to contact the network(s) (e.g., the EPC network 106 and/or the example E-UTRAN 104) on a periodic basis may provide one or more indication(s) of the next instance in which a data connection attempt(s) will be made. In other examples, an application may include a status bit, register and/or timer indicative of future communication attempt(s) to be expected by the network(s).

The UE 102 may be characterized by any number of modes and/or protocols operating therewith. In some examples, a radio resource control (RRC) protocol is employed to, in part, handle control plane signaling between the UE 102 and one or more radio access network(s) (e.g., the example E-UTRAN 104 of FIG. 1). The RRC protocol includes one or more functions for connection establishment and release, system information broadcast techniques, radio bearer establishment/reconfiguration and/or release, outer loop power control, etc. Typically, there can be only one RRC connection open to a UE at any one time. Accordingly, the methods and apparatus described herein are not limited to connection re-establishment by way of EMM state monitoring, as described above, but may also monitor one or more RRC states, as described in further detail below.

Prior to a UE (such as the example UE 102 of FIG. 1) receiving context information from an EPC network (such as the EPC network 106 of FIG. 1), an E-UTRAN (such as the E-UTRAN 104 of FIG. 1) completes an RRC connection establishment. As one or more processes associated with the RRC protocol are completed, the UE 102 may operate in either RRC_IDLE mode or RRC_CONNECTED mode. The UE 102 may leave the RRC_CONNECTED mode for any number of reasons including, but not limited to the occurrence of a radio connection failure.

Figure 8:
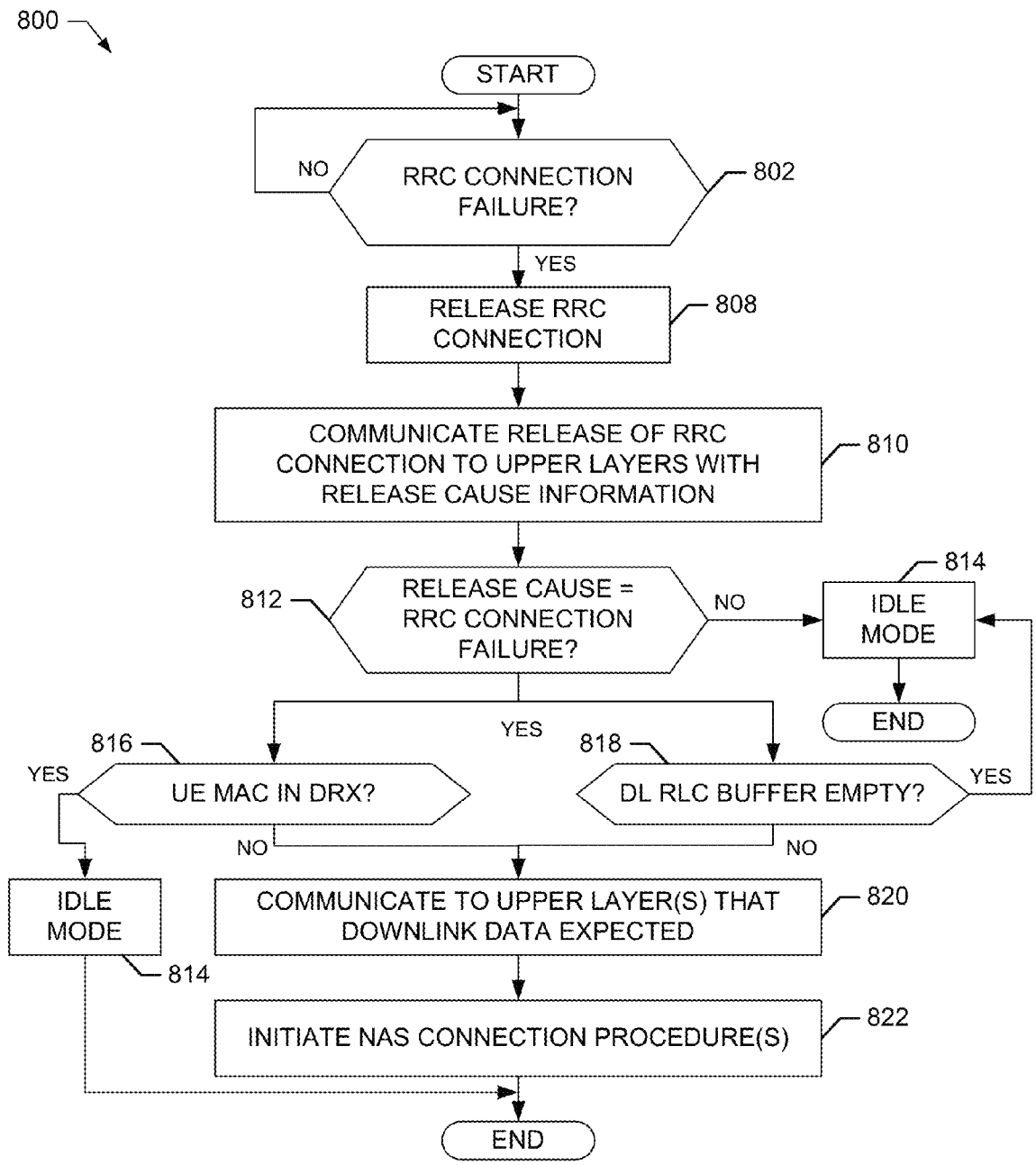

FIG. 8 depicts a flow diagram representative of an example process 800 that may be implemented using computer readable instructions to initiate a NAS recovery/connection procedure. In some examples, the process 800 may conform to all or part of TS 36.331, section 5.3.12. In the illustrated example of FIG. 8, the UE 102 monitors its RRC state for an indication of a radio connection failure (block 802). The radio connection failure may be evident based on, for example, the UE 102 determining whether the RRC_CONNECTED mode is still true. If so, the UE 102 continues to monitor for an indication of a radio connection failure (block 802), otherwise the UE 102 releases the RRC connection (block 808). Without limitation, releasing the RRC connection may include performing a medium access control (MAC) reset and stopping all timers except timer T320. Additionally, all radio resources may be released including, but not limited to RLC entities, MAC configuration(s) and/or associated packet data convergence protocol (PDCP) entities for any established radio bearer(s).

In the illustrated example of FIG. 8, the UE 102 communicates the release of the RRC_CONNECTED mode to one or more upper layer(s) with information indicative of the release cause (block 810). In the event that the release cause is not indicative of an RRC connection failure (block 812), the UE 102 resides in an idle mode (e.g., RRC_IDLE) (block 814). However, in the event that the release cause is indicative of an RRC connection failure (block 812), then the UE 102 may proceed to determine whether a discontinuous reception mode (DRX) is true (e.g., "active") (block 816) and/or determine whether one or more downlink radio link control buffers is empty (block 818). Without limitation, the methods and apparatus described herein may identify whether DRX mode is true (e.g., "active") or false (e.g., "not active"). For example, if the UE MAC was in a DRX mode (e.g., an inactivity timer is running), then the example UE 102 may be in a power saving mode for which the NAS connection procedure is unnecessary. In other examples, the DRX mode may be deemed false when the inactivity timer is not running and/or contains a null value. Accordingly, the example UE 102 may reside in an idle mode (block 814) (e.g., RRC_IDLE). In another example, if one or more downlink radio link control buffers is empty (block 818), then the UE 102 is not expecting any downlink data and the NAS connection procedure is unnecessary. Accordingly, the UE 102 may reside in the idle mode (block 814).

In circumstances where the UE MAC is not in DRX mode (block 816) and/or where the downlink RLC buffer is not empty (block 818), then further communication between the UE 102 and the network(s) is expected. Accordingly, the UE 102 communicates to one or more upper layer(s) that downlink data is expected (block 820) and a NAS connection procedure(s) is initiated (block 822).

While the aforementioned methods and apparatus described one or more techniques to determine whether to initiate a NAS connection procedure based on indications of uplink/downlink data, the methods and apparatus described herein are not limited thereto. In some examples, determining whether to initiate the NAS connection procedure may be determined based on conditions related to a quality of service (QoS) of one or more bearer(s). Generally speaking, some bearers are established to maintain a guaranteed bit rate (GBR) and/or a certain QoS class identifier (QCI). As described in further detail below, QCIs may include, but are not limited to numerical designators associated with predetermined packet delay value(s), packet error loss rate(s) and/or priorit(ies). In the event that a UE, such as the UE 102 of FIG. 1, is or was configured with one or more bearers that have a GBR, specific QCI and/or a threshold value range of QCI, the UE 102 may trigger and/or otherwise send a TAU message (or other NAS connection procedure request(s)). As a result, the methods and apparatus described herein allow the UE 102 to send the TAU message (or other NAS connection procedure request(s)) only if data is associated with information that is likely time critical.

The example methods and apparatus described herein are not limited to UEs operating with LTE, but may be employed when the UE regains radio coverage in GSM (sometimes referred to as "2G") and/or UMTS Terrestrial Radio Access Network (UTRAN) (sometimes referred to as "3G") and/or the like RAT modes following a failure from LTE. In such circumstances, a routing area update (RAU) message would be sent rather than a TAU message. In GSM/UMTS environments, the UE is required to map one or more EPS bearers into packet data protocol (PDP) contexts when changing from one RAT to another. Criteria related to GSM/UMTS QoS include, but are not limited to a precedence class (e.g., 'high priority,' 'low priority,' etc.), and/or a traffic handling priority (e.g., handling values 1 to 3). Upon regaining coverage in GSM/UMTS, the UE 102 may determine whether a registration procedure should be initiated based on previous (LTE) EPS bearer contexts. For example the previous contexts may include criteria on the presence of GBR (e.g., GBR, non-GBR) and/or QCI value(s) in a manner consistent with 3GPP TS 23.203. In other examples, after regaining coverage in GSM/UMTS, the UE 102 may determine, via the PDP context QoS manager 390, whether a registration procedure should be initiated based on new PDP contexts in the GSM/UMTS environment. For example, the UE 102 may employ criteria based on, without limitation, a precedence class or a traffic handling priority in a manner consistent with 3GPP TS 24.008 and described in further detail below in connection with Table 1.

If the UE 102 loses coverage, a TAU or RAU message (e.g., depending on the environment LTE or GSM/UMTS, respectively) may be sent if there are one or more GBR data radio bearers having a certain QCI values, maximum/minimum uplink/downlink bit rate(s), guaranteed uplink/downlink bit rate(s), etc. Generally speaking, voice calls over a given RAT have a GBR and higher priority, which justifies a subsequent RAU/TAU in the event of a loss of UE coverage. On the other hand, packet data is typically associated with non-GBR criteria because it is more tolerant of delay, thereby allowing RAU/TAU request(s) to be avoided and/or delayed to avoid inundating the network(s).

Table 1 illustrates an example QoS information element (IE) in accordance with 3GPP TS 24.008. In the illustrated example of Table 1, one or more conditions of the RAT may be characterized to determine whether a RAU/TAU is appropriate.

TABLE 1

| 8 | 7 | 6 | 5 | 4 | 3 | 2 | 1 | |
|---|---|---|---|---|---|---|---|---|
| | | | Quality of service IEI | | | | | Octet 1 |
| | | | Length of quality of service IE | | | | | Octet 2 |
| spare | | | delay class | | Reliability class | | | Octet 3 |
| Peak throughput | | | | 0 | Precedence class | | | Octet 4 |
| | | | Spare | | | | | |
| spare | | | | Mean throughput | | | | Octet 5 |
| Traffic class | | | Delivery order | | Delivery of erroneous SDU | | | Octet 6 |
| | | | Maximum SDU size | | | | | Octet 7 |
| | | | Maximum bit rate for uplink | | | | | Octet 8 |
| | | | Maximum bit rate for downlink | | | | | Octet 9 |
| Residual BER | | | | SDU error ratio | | | | Octet 10 |
| | | | Transfer delay | | | Traffic Handling priority | | Octet 11 |
| | | | Guaranteed bit rate for uplink | | | | | Octet 12 |
| | | | Guaranteed bit rate for downlink | | | | | Octet 13 |
| spare | | | Signaling indication | | Source Statistics Descriptor | | | Octet 14 |
| | | | Maximum bit rate for downlink (extended) | | | | | Octet 15 |
| | | | Guaranteed bit rate for downlink (extended) | | | | | Octet 16 |
| | | | Maximum bit rate for uplink (extended) | | | | | Octet 17 |
| | | | Guaranteed bit rate for uplink (extended | | | | | Octet 18 |

Conditions may be expressed in any number of ways including, but not limited to whether PDP context(s) were activated and/or should be activated with a traffic class of type conversational, streaming, or both. Without limitation, conditions may be expressed as whether PDP context(s) were activated with a precedence class of type high priority, normal priority, or both. Additionally, conditions may be expressed as whether PDP context(s) were activated with a traffic handling priority of type 1 or 2. Based on example conditions present, one or more RAU/TAU messages may be initiated in view of whether or not conditions are true, false, condition value(s) and/or any combination thereof.

In the event that DRBs exist having a certain QCI value, such as a value that reflects streaming, one or more RAU/TAU messages may be initiated in view of the QCI value, a corresponding resource type (e.g., GBR, non-GBR), a priority value (e.g., a numerical integer value), a packet delay budget value measured in milliseconds, and/or a packet error loss rate value. For example, a QCI value of 1 is a GBR resource having a priority value of '2,' a packet delay budget of 100 mS, and a packet error loss rate of $10^{-2}$ (in accordance with 3GPP TS 23.203—Table 6.1.7). The example QCI value of 1 is associated with conversational voice services, which typically demand a higher priority and are less tolerant of relatively high packet delay times.

Figure 9:
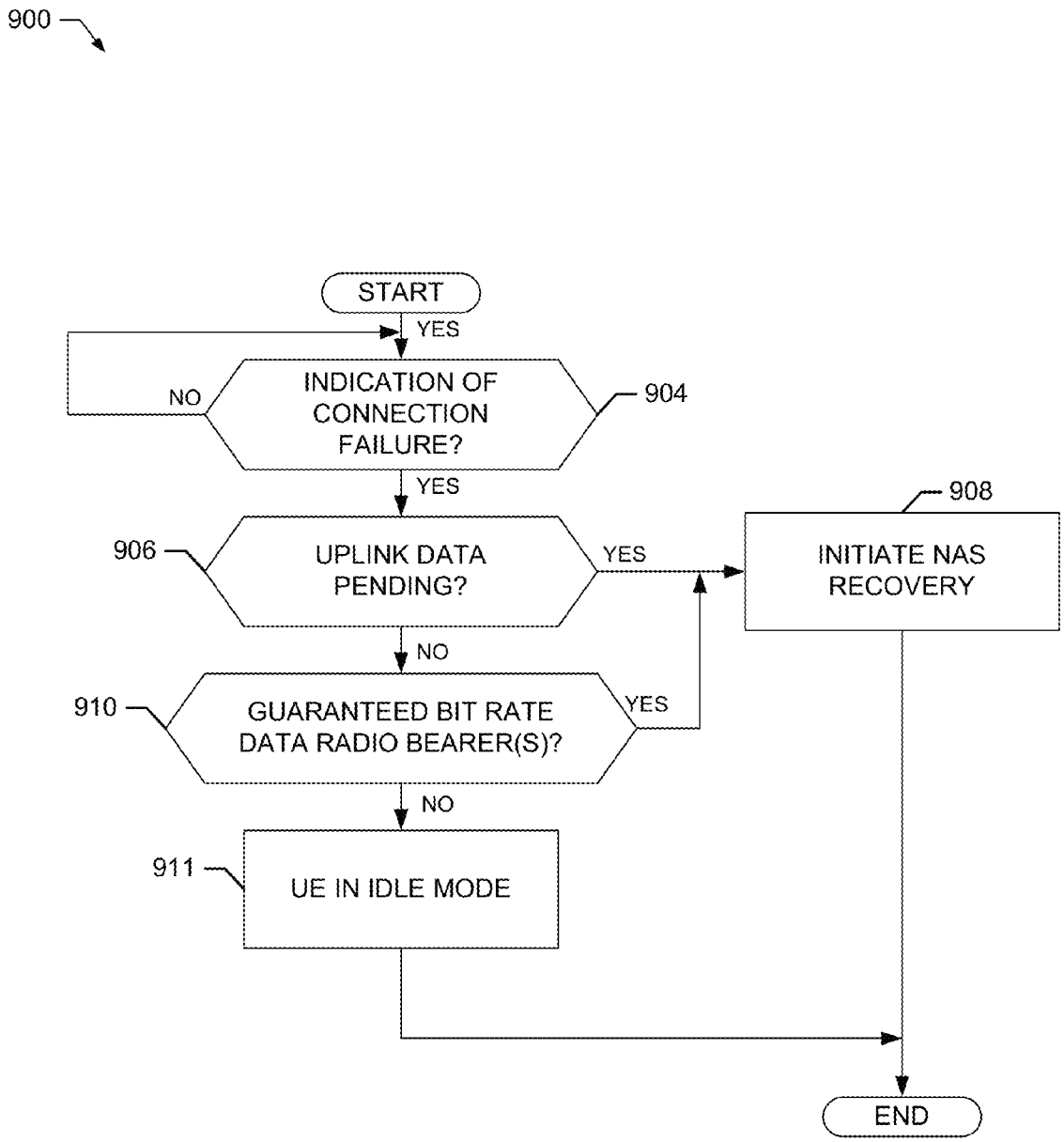

FIG. 9 depicts a flow diagram representative of an example process 900 that may be implemented using computer readable instructions to initiate one or more RAU/TAU messages. In some examples, the process 900 may conform to all or part of TS 24.301, section 5.5.3.2.2. In the illustrated example of FIG. 9, the UE 102 determines whether an indication of a connection failure has been received (block 904). If not, then the UE 102 continues to monitor for an indication of failure (block 904). The indication of the connection failure may be evidenced by way of a radio connection failure and/or a radio resource control connection failure message. As used herein, a radio connection failure may include a radio resource control (RRC) connection failure and/or a radio link failure. If the UE 102 determines that such a connection failure has occurred (block 904), the UE 102 determines whether it has uplink data pending (block 906) and, if so, initiates NAS recovery (block 908). The NAS recovery procedure (block 908) may be a TAU procedure, a RAU procedure, or a Service Request procedure. However, if there is no uplink data pending (block 906), the UE 102 determines whether there exist any GBR radio bearer(s) (block 910). In other words, the UE 102 identifies when the UE 102 has GBR EPS bearer(s) activated (or will be activated) or not. If not, then the UE 102 enters idle mode (block 911), otherwise the UE 102 initiates a NAS recovery (block 908). Additionally or alternatively, one or more alternate and/or additional conditions may trigger/initiate the NAS recovery procedure. As described above, determining whether to initiate NAS connection procedures may be determined based on bearer QoS, bearer GBR and/or bearer QCI.

Figure 10:
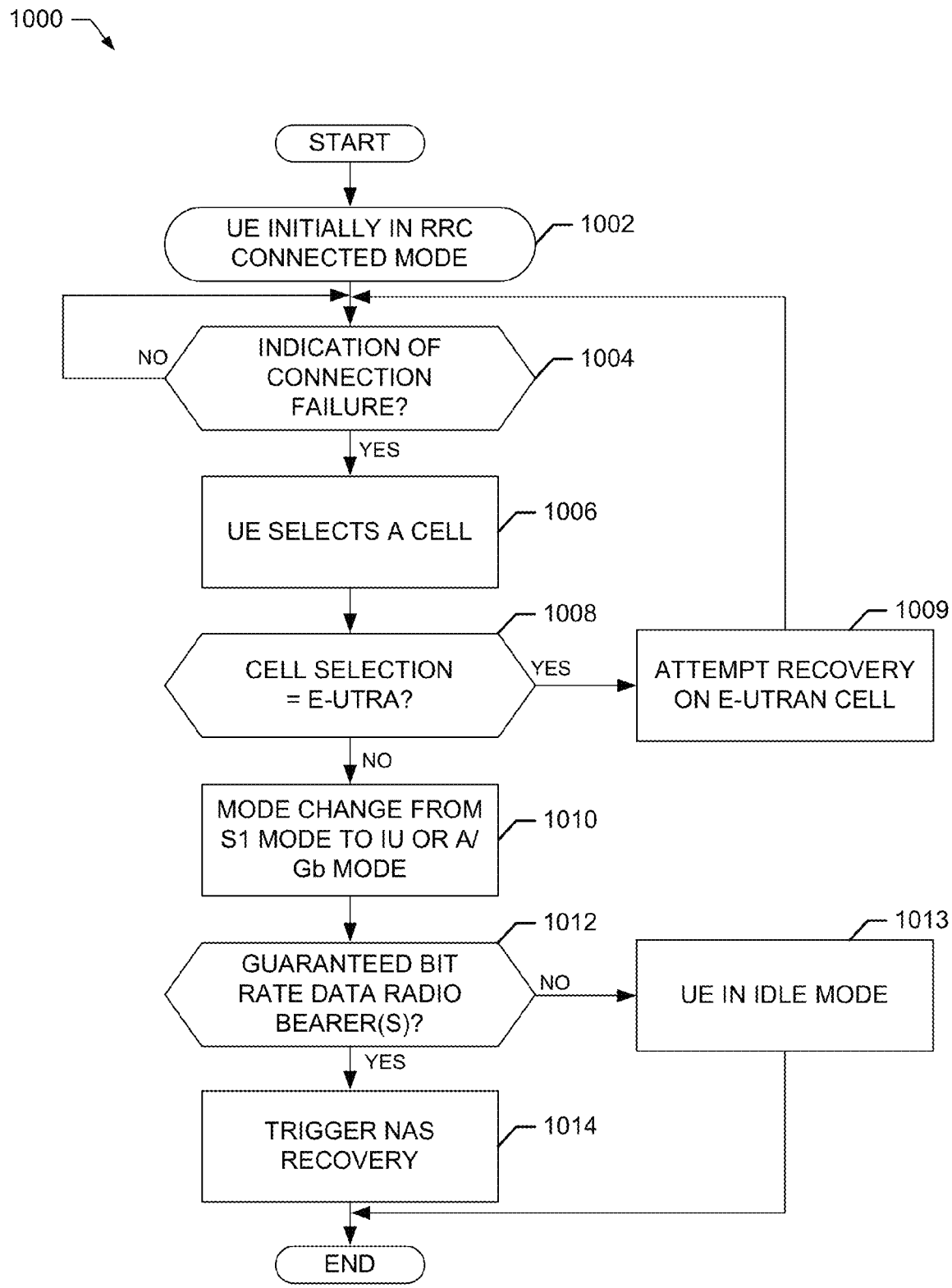

In other examples, the UE 102 determines whether to trigger a NAS recovery procedure after the UE experiences a data connection loss from LTE to another RAT. FIG. 10 depicts a flow diagram representative of an example process 1000 that may be implemented using computer readable instructions to initiate the NAS recovery procedure. In some examples, the process 1000 may conform to all or part of TS 24.008, section 4.7.5. Additionally or alternatively, the process 1000 may be referred to as a combined routing area updating procedure initiation in accordance with TS 24.008, section 4.7.5.2.1. In the illustrated example of FIG. 10, the UE, such as the UE 102 of FIG. 1, is initially in RRC Connected mode (block 1002). If no connectivity errors occur (block 1004), the UE 102 stays in the RRC connected mode. However, when the UE 102 experiences an error (block 1004), the UE 102 selects an available cell (block 1006). If the UE 102 selects an E-UTRA (block 1008), then the process 1000 continues to attempt recovery on the E-UTRAN cell (block 1009), otherwise a mode change occurs from an S1 mode to a non-LTE mode (block 1010), as described above. As described above, the UE 102 may obtain and/or otherwise receive an indication of a failure from one or both of the lower layer (e.g., an RRC connection failure message) or upper layer (e.g., an application).

After the mode change (block 1010), the UE 102 determines whether one or more radio bearers operates according to a guaranteed bit rate (GBR) (block 1012) (e.g., the UE 102 had one or more GBR radio bearers activated). If not, then little motivation exists in triggering the NAS recovery procedure, and the UE 102 enters idle mode (block 1013). However, if the UE 102 determines that one or more radio bearers operates according to a GBR, the UE 102 triggers a NAS recovery procedure (block 1014). The NAS recovery procedure is performed on the non E-UTRA cell (e.g., on E-UTRA)

such as, for example, on the GSM or UMTS cell. The NAS recovery procedure may be a RAU, a combined RAU, or a Service Request procedure.

Figure 11:
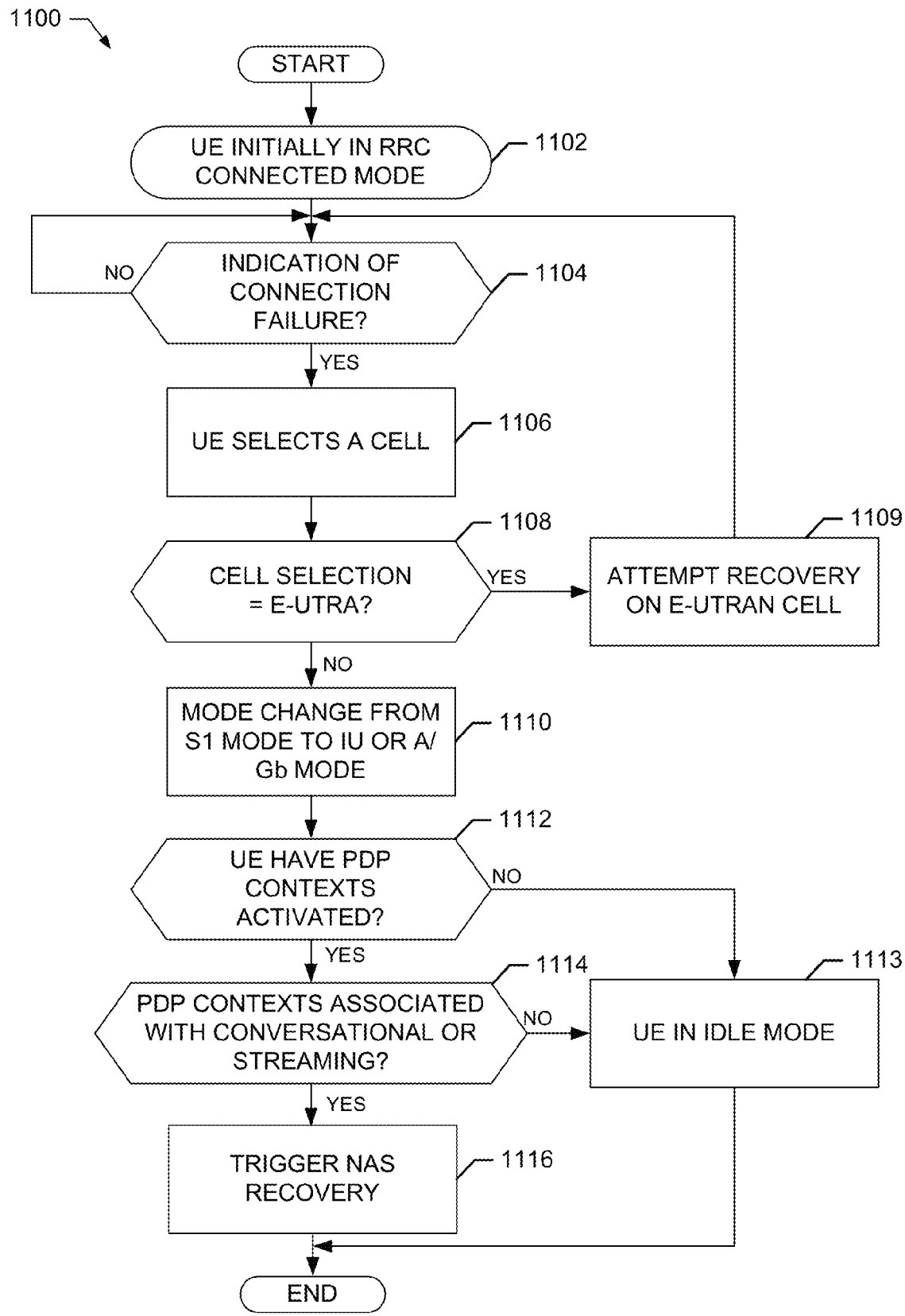

In other examples, conditions based on GSM and/or UMTS QoS may be active. In such circumstances the UE 102 may monitor, detect and/or otherwise receive an indication regarding the presence of packet data protocol (PDP) contexts that have been or should be activated. FIG. 11 depicts a flow diagram representative of an example process 1100 that may be implemented using computer readable instructions to initiate the NAS recovery procedure. In some examples, the process 1100 may conform to all or part of TS 24.008, section 4.7.5. Additionally or alternatively, the process 1100 may be referred to as a combined routing area updating procedure initiation in accordance with TS 24.008, section 4.7.5.2.1. In the illustrated example of FIG. 11, the UE, such as the UE 102 of FIG. 1, is initially in RRC Connected mode (block 1102). If no connectivity errors occur (block 1104), the UE 102 stays in the RRC Connected mode. However, when the UE 102 experiences an error (block 1104), the UE 102 selects an available cell (block 1106). The indication of the connection failure (block 1104) may be received from lower layers due to, for example, one or more lower layer failures while the UE 102 was in S1 mode. Additionally or alternatively, as GMM protocol may receive an indication of RRC connection failure from one or more lower layers (block 1104). As described above, the example indication of connection failure(s) (block 1104) may be based on information from the upper layer, such as the application layer.

If the UE 102 selects an E-UTRA (block 1108), then the process 1100 continues to attempt recovery of the connection on the E-UTRAN cell (block 1109), otherwise a mode change occurs from an LTE mode (e.g., an "S1" mode) to a non-LTE mode (block 1110). Non-LTE modes may include, but are not limited to UMTS based mode(s) (e.g., Iu mode), GSM based mode(s), and/or GSM-Edge based mode(s) (e.g., A/Gb mode).

After the mode change (block 1110), the UE 102 determines whether any PDP contexts are activated (block 1112). Generally speaking, a PDP context is a data structure present in UE and SGSN and GGSN, which contains the subscriber's session information during an active session. In other words, if a PDP context is activated, then an active session was likely occurring when the failure occurred (block 1104). Absent any active PDP context(s) (block 1112), the UE 102 enters idle mode (block 1113).

While an active PDP context(s) may indicate that the subscriber (e.g., the UE 102) was involved in an active session, every type of active session may not warrant a NAS recovery procedure. For example, some active PDP context(s) may be associated with a traffic class indicative of a lower priority, while a traffic class of type conversational or streaming may indicate a higher priority and/or lower tolerance to interruption. In the latter example scenario, the NAS recovery procedure may be warranted. Accordingly, if the PDP contexts (block 1112) are identified as having an associated traffic class of type conversational or streaming (block 1114), then the NAS recovery procedure is triggered (block 1116), otherwise the UE 102 enters idle mode (block 1113).

Figure 12:
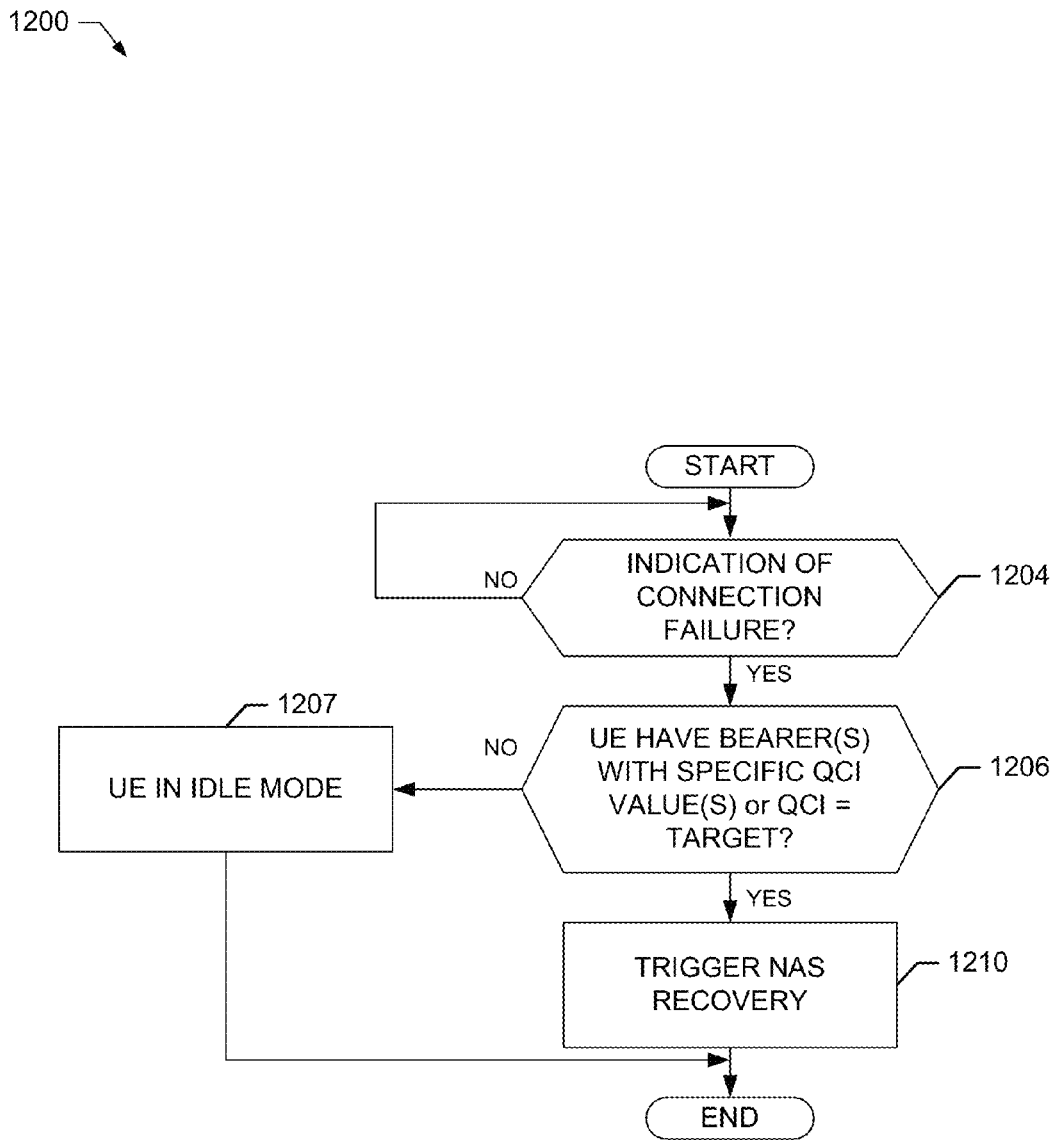

As described above, the UE 102 may initiate a NAS recovery procedure based on one or more QCI values. FIG. 12 depicts a flow diagram representative of an example process 1200 that may be implemented using computer readable instructions to initiate the NAS recovery procedure (e.g., RAU/TAU messages). In some examples, the process 1200 may conform to all or part of TS 24.301, section 5.5.3.2.2. In the illustrated example of FIG. 12, the UE 102 determines whether an indication of a connection failure has been received (block 1204). If not, then the UE 102 continues to monitor for a failure (block 1204). The example indication of the connection failure may be evidenced by way of a radio connection failure and/or a radio resource control connection failure message. If the UE 102 determines that such a connection failure has occurred (block 1204), the UE 102 determines whether one or more bearers (e.g., radio bearers) is associated with a specific QCI value and/or whether the QCI has a target value (block 1206). The specific QCI value(s) may be indicative of one or more characteristics (as described above) such as, but not limited to a resource type (e.g., GBR, non-BGR), a priority weight, a packet delay budget and/or a packet error loss rate. As such, some specific QCI value(s) may not warrant triggering/initializing the NAS recovery procedure. The UE 102 determines whether the specific QCI value falls within a target value. Such target QCI value(s) may be established by a network administrator, a user of the UE 102, etc. In the event that the QCI value is not one of the target value(s), then the UE 102 enters idle mode (block 1207). However, when the QCI value(s) match a target value, such as a target value established by a network administrator, the UE triggers a NAS recovery procedure(s) (block 1210), such as a TAU message.

The methods and apparatus described herein also facilitate NAS recovery trigger decisions based on network information. In some examples, the network provides one or more indications and/or instructions prior to a data connection loss. The network may indicate and/or otherwise instruct the example UE 102 by including a NAS recovery indicator in a broadcast or point-to-point signaling message(s). Such NAS recovery indicator(s) provide UE 102 instructions regarding behavior to occur in case of data connection loss when there is no uplink data pending. NAS recovery indicator(s) may be employed as one or more bits and/or values to instruct the UE 102 to, for example, attempt to recover a lost connection by sending TAU/RAU request(s), refrain from sending TAU/RAU request(s), initiate TAU/RAU request(s) based on downlink data expectations, initiate TAU/RAU request(s) based on QoS criteria, and/or any combination thereof. In the event of initiation based on QoS criteria, such criteria values may be provided by the network in the NAS recovery indicator(s) and/or provided by one or more applications and/or by the user of the example UE 102. Without limitation, the UE 102 may suggest value(s) for the NAS recovery indicator(s) based on, for example, one or more application(s) executing on the UE 102. The NAS recovery indicator may be a single indicator for the UE or may be an indicator per EPS bearer context established in the UE.

Additionally or alternatively, the methods and apparatus described herein also facilitate implementation of a NAS recovery timer to determine whether a NAS recovery procedure should be initiated (e.g., TAU/RAU requests). In some examples, the NAS recovery timer may operate in view of a maximum recovery time (e.g., a timer setpoint value), in which the UE 102 is only allowed to attempt recovery (e.g., recovery via one or more TAU/RAU requests) if the time elapsed since the loss of connection has not exceeded a maximum threshold value (e.g., the timer setpoint value). In operation, a NAS maximum recovery timer may be started when a failure (e.g., a lower layer failure, an upper layer failure, etc.) is detected, and the NAS maximum recovery timer may be stopped when the TAU/RAU request(s) have been sent. Generally speaking, the UE is allowed to make re-connection attempts for a finite period of time and, to prevent inundating the network with such requests for an indefinite amount of time, further attempts to re-connect are disallowed after the setpoint value of time is reached. The NAS maximum recovery timer may be a single timer value for the UE or may be a value per EPS bearer context or per PDP context established in the UE.

In other examples, the NAS recovery timer may operate in view of a minimum recovery time, in which the UE 102 is only allowed to attempt recovery if the time elapsed since the loss of connection is above a minimum recovery time value (e.g., a setpoint value). Such a NAS minimum recovery timer may be started when a failure is detected, and the NAS minimum recovery timer may be stopped when the TAU/RAU request(s) have been sent. In this example, the comparison between a running timer of the UE 102 and a setpoint value will prevent the UE 102 from initiating one or more recovery action(s) before the setpoint value of time is reached. The NAS minimum recovery timer may be a single timer value for the UE or may be a value per EPS bearer context or per PDP context established in the UE.

Table 2 illustrates example information elements and messages that may be sent by the network to the UE 102 to establish and/or otherwise initiate a NAS recovery indicator and/or a NAS recovery timer. In some examples, the example Table 2 information elements may operate in accordance with 3GPP TS 24.301, section 8.3.3.1 and/or section 8.3.18.1.

TABLE 2

| IEI | | | | |
|---|---|---|---|---|
| Information Element | Type/Reference | Presence | Format | Length |
| Protocol discriminator | Protocol discriminator 9.2 | M | V | 1/2 |
| EPS bearer identity | EPS bearer identity 9.3.2 | M | V | 1/2 |
| Procedure transaction identity | Procedure transaction identity 9.4 | M | V | 1 |
| Activate dedicated EPS bearer context request message identity | Message type 9.8 | M | V | 1 |
| Linked EPS bearer identity | Linked EPS bearer identity | M | V | 1/2 |
| Spare half octet | Spare half octet 9.9.2.9 | M | V | 1/2 |
| EPS QoS | EPS quality of service | M | LV | 2-10 |
| TFT | Traffic flow template 9.9.4.16 | M | LV | 2-256 |
| Transaction identifier | Transaction identifier 9.9.4.17 | O | TLV | 3-4 |
| Negotiated QoS | Quality of service 9.9.4.12 | O | TLV | 14-18 |
| Negotiated LLC SAPI | LLC service access point identifier 9.9.4.7 | O | TV | 2 |
| Radio Priority | Radio priority 9.9.4.13 | O | TV | 1 |
| Packet flow Identifier | Packet flow identifier 9.9.4.8 | O | TLV | 3 |
| Protocol configuration options | Protocol configuration options 9.9.4.11 | O | TLV | 3-253 |
| NAS recovery indicator | NAS recovery 9.9.4.y | O | TV | 1 |
| NAS recovery timer | NAS recovery timer 9.9.4.v | O | TV | 1 |

In the illustrated example of Table 2, when the NAS recovery indicator of the EPS bearer context is modified, the network shall include the modified NAS recovery indicator assigned to the EPS bearer context. At least one purpose of the NAS recovery indicator information element is to define the UE behavior when the data connection is lost due to a failure (e.g., a lower layer failure, an upper layer failure, etc.). The NAS recovery indicator defines the conditions for triggering a recovery procedure(s) (e.g., a TAU/RAU) when the data connection is lost with no uplink user data pending. In some examples, a TAU/RAU request is initiated when the data connection is lost due to a lower layer failure and no uplink data is pending for transmission.

The NAS recovery indicator IE may be coded as shown below in Table 3.

TABLE 3

| 8 | 7 | 6 | 5 | 4 | 3 | 2 | 1 | |
|---|---|---|---|---|---|---|---|---|
| NAS recovery indicator IEI | | | | 0 Spare | 0 Spare | NAS recovery indicator result value | | Octet 1 |

Example Table 4 illustrates bit values and corresponding actions of Octet 1 indicator values. While the examples of Table 4 illustrate specific actions, such actions are provided by way of example and not limitation. Additionally, while the examples of Table 4 illustrate bit values of length two (2), any other bit value lengths may be employed, without limitation.

TABLE 4

| Bit Value | | |
|---|---|---|
| Bit 2 | Bit 1 | Action |
| 0 | 0 | The UE shall attempt to recover the connection by sending TAU/RAU |
| 0 | 1 | The UE shall attempt to recover the connection by sending TAU/RAU if downlink data is expected |
| 1 | 0 | The UE shall not attempt to recover the connection by sending TAU/RAU |
| 1 | 1 | The UE shall attempt to recover the connection by sending TAU/RAU if one or more QCI(s) of the EPS bearer context(s) have the value(s) 1, 2 or 3. |

Example Table 5 illustrates example bit values and corresponding actions of the NAS recovery timer described above.

TABLE 5

| Bit Value | | | | |
|---|---|---|---|---|
| Bit 4 | Bit 3 | Bit 2 | Bit 1 | Action |
| 0 | 0 | 0 | 0 | 2 seconds |
| 0 | 0 | 0 | 1 | 4 seconds |
| 0 | 0 | 1 | 0 | 6 seconds |
| 0 | 0 | 1 | 1 | 8 seconds |
| ... | ... | ... | ... | ... |
| 1 | 1 | 1 | 1 | 32 seconds |

In the illustrated example of Table 5 above, a NAS recovery timer may correspond to a minimum or maximum recovery time based on a given bit pattern. For example, a bit pattern of 0010 may correspond to a six (6) second maximum recovery time. While the examples of Table 5 illustrate specific actions and/or durations, such actions and durations are provided by way of example and not limitation. Additionally, while the examples of Table 5 illustrate bit values of length four (4), any other bit value lengths may be employed, without limitation. Other coding methods are possible, such as, for example, different value ranges, different grading (e.g., exponential instead of linear), different scales (e.g., seconds, minutes, etc.). In some circumstances, the IEs are optional and may be specified to employ default values when enabled. For example, if the NAS recovery indicator is enabled without a specific bit value, then the UE shall unconditionally attempt a NAS recovery procedure. In another example, if a maximum recovery time is unbounded, then the UE is not restricted to any time limit when attempting the NAS recovery procedure. On the other hand, if an example minimum recovery time is set to zero, then the minimum recovery timer will not apply/operate. Any other default possibilities are possible, without limitation.

While the aforementioned methods and apparatus described initiating a NAS recovery procedure based on, for example, uplink data, downlink data, GBR bearer types, QCI values, network information (e.g., NAS recovery indicators, NAS recovery timers), etc., the methods and apparatus described herein may employ one or more conditional combinations to determine whether or not to initiate the NAS recovery procedure. For example, in the event that the UE 102 receives an indication of a connection failure, has information that downlink data is expected (e.g., information received from the application layer), and that the UE employs one or more GBR bearers, then the UE 102 may decide to initiate the NAS recovery procedure.

Although certain methods, apparatus, and articles of manufacture have been described herein, the scope of coverage of this disclosure is not limited thereto. To the contrary, this disclosure covers all methods, apparatus, and articles of manufacture fairly falling within the scope of the appended claims either literally or under the doctrine of equivalents. Additionally, the scope of coverage of the present disclosure is not limited to 3GPP systems, but may relate to other wireless and/or non-wireless systems including, but not limited to Institute of Electrical and Electronics Engineers systems and CDMA systems.

What is claimed is:

1. A method in a wireless device, the method comprising: the wireless device detecting an indication of a radio connection failure from at least one of a radio link control (RLC) layer or a medium access control (MAC) layer; the wireless device identifying whether the wireless device has uplink user data pending in response to the radio connection failure; the wireless device identifying whether the wireless device has active evolved packet system (EPS) or packet data protocol (PDP) bearers having certain quality of service, QoS comprising guaranteed bit rate (GBR), criteria when the wireless device has no uplink user data pending, the certain QoS criteria comprising at least one certain QoS class identifier, QCI, value; triggering a registration procedure comprising tracking and routing area updating procedures in response to identifying the certain QoS criteria and the uplink user data pending; and invoking recovery procedure based on the bearer quality of the QoS when the wireless device has the uplink user data pending.

2. A method as described in claim 1, wherein the QoS criteria further comprises the presence of a guaranteed bit rate, GBR, bearer.

3. A method as described in claim 2, wherein the GBR bearer comprises an evolved packet system, EPS, bearer.

4. A method as described in claim 1, wherein the QCI value falls within a threshold value range to cause the trigger of the registration procedure.

5. A method as described in claim 1, wherein the certain QoS criteria of the active bearer is identified based on evolved packet system bearer contexts or packet data protocol contexts.

6. A mobile station including hardware and software stored on a tangible computer readable medium that, during operation, cause the mobile station to, at least: detect an indication of a radio connection failure from at least one of a radio link control (RLC) layer or a medium access control (MAC) layer; identify whether the mobile station has uplink user data pending in response to the radio connection failure; identify whether the mobile station has active evolved packet system (EPS) or packet data protocol (PDP) bearers having certain quality of service, QoS comprising guaranteed bit rate (GBR), criteria when the mobile station has no uplink user data pending, the certain QoS criteria comprising at least one certain QoS class identifier, QCI, value; trigger a registration procedure comprising tracking and routing area updating procedures in response to identifying the certain QoS criteria and the uplink user data pending; and invoking recovery procedure based on the bearer quality of the QoS when the wireless device has the uplink user data pending.

7. A mobile station as described in claim 6, wherein the QoS criteria further comprises the presence of a guaranteed bit rate, GBR, bearer.

8. A mobile station as described in claim 7, wherein the GBR bearer comprises an evolved packet system, EPS, bearer.

9. A mobile station as described in claim 6, wherein the QCI value falls within a threshold value range to cause the trigger of the registration procedure.

10. A mobile station as described in claim 6, wherein the hardware and software further cause the mobile station to base the certain QoS criteria of the active bearer on evolved packet system bearer contexts or packet data protocol contexts.

11. A method as described in claim 1, wherein the QoS criteria comprises the presence of an activated bearer having a guaranteed bit rate, GBR, bearer.

12. A method as described in claim 11, wherein the GBR bearer further comprises an evolved packet system bearer.

13. A mobile station as described in claim 6, wherein the QoS criteria in the mobile station comprises the presence of an activated guaranteed bit rate, GBR, bearer.

14. A mobile station as described in claim 13, wherein the GBR bearer further comprises an evolved packet system bearer.

* * * * *